United States Patent
Beale

(10) Patent No.: US 8,098,621 B2
(45) Date of Patent: Jan. 17, 2012

(54) COMPATIBLE BROADCAST DOWNLINK AND UNICAST UPLINK INTERFERENCE REDUCTION FOR A WIRELESS COMMUNICATION SYSTEM

(75) Inventor: Martin W. Beale, Bristol (GB)

(73) Assignee: IPWireless, Inc., San Francisco, CA (US)

( * ) Notice: Subject to any disclaimer, the term of this patent is extended or adjusted under 35 U.S.C. 154(b) by 570 days.

(21) Appl. No.: 11/209,281

(22) Filed: Aug. 23, 2005

(65) Prior Publication Data
US 2007/0054625 A1 Mar. 8, 2007

(51) Int. Cl.
*H04W 4/00* (2009.01)
(52) U.S. Cl. ............... 370/329; 370/328; 370/330
(58) Field of Classification Search ........... 370/329, 370/238, 330, 328; 455/69
See application file for complete search history.

(56) References Cited

U.S. PATENT DOCUMENTS

| | | | |
|---|---|---|---|
| 6,671,260 B1 * | 12/2003 | Engstrand | 370/238 |
| 2002/0136169 A1 | 9/2002 | Struhsaker et al. | |
| 2003/0021257 A1 | 1/2003 | Sato et al. | |
| 2005/0083440 A1 * | 4/2005 | Kang | 348/723 |

FOREIGN PATENT DOCUMENTS

| | | |
|---|---|---|
| EP | 1122895 A1 | 8/2001 |
| EP | 1152572 A1 | 11/2001 |
| JP | 2002368757 | 12/2002 |
| JP | 2003037626 | 2/2003 |
| WO | WO-01/08438 A1 | 2/2001 |
| WO | WO-02/071694 A2 | 9/2002 |
| WO | 03088510 | 10/2003 |
| WO | 2005036917 | 4/2005 |

OTHER PUBLICATIONS

International Written Opinion mailed Nov. 21, 2007, for PCT Application No. PCT/EP2006/064462 filed Jul. 20, 2006, 6 pages.
"3rd Generation Partnership Project; Technical Specification Group Radio Access Network; Introduction of the Multimedia Broadcast Multicast Service (MBMS) in the Radio Access Network (RAN); Stage 2 (Release 6)," (Mar. 2004). 3GPP:Valbonne, France, TS 25.346 v6.0.0:1-50.
International Search Report mailed Nov. 17, 2006, for PCT Application No. PCT/EP2006/064462 filed Jul. 20, 2006, 2 pages.

(Continued)

*Primary Examiner* — Pierre-Louis Desir
(74) *Attorney, Agent, or Firm* — Fitch Even Tabin & Flannery

(57) ABSTRACT

Embodiments of the current invention reduce interference from a mobile station (UE) uplink transmission to a received broadcast downlink transmission through a network-based scheduling of time-slotted downlink broadcast transmissions, so that they do not occur concurrently with uplink transmissions. The invention allows low cost, low power UEs to be designed and built by use of the following techniques: (i) downlink broadcast transmissions are time-slotted; (ii) UEs operate either in half-duplex mode for transmission and reception of unicast services, or in full duplex mode where additional bandpass or additional highpass filtering can be applied to the DL unicast carrier; (iii) when unicast services are active for a UE, the UE informs the network of the broadcast services that are being decoded; and (iv) the network schedules unicast transmissions, broadcast transmissions, or both unicast and broadcast transmissions such that the uplink unicast transmission to a UE is never time-coincident with the broadcast transmissions to that UE.

24 Claims, 23 Drawing Sheets

OTHER PUBLICATIONS

NTT DoCoMo. (May 9-13, 2005). "Physical Channel Structures for Evolved UTRA," 3GPP TSG RAN WG1 Meeting #41, R1-050464, Athens, Greece, pp. 1-13.

Qualcomm Europe. (Jun. 20-21, 2005). "Principles for E-UTRA Simulcast," 3GPP TSG RAN WG1 LTE Ad Hoc, R1-050654, Sophia Antipolis, France, 9 pages.

3rd Generation Partnership Project, Technical Specification Group Services and System Aspects, Technical Specifications and Technical Reports for a UTRAN-based 3GPP system, (Release 6) 3GPP TS 21.101 V6.2.0 (Jun. 2005).

3rd Generation Partnership Project, Technical Specification Group Services and System Aspects, Evolution of 3GPP System, (Release 6) 3GPP TR 21.902 V6.0.0 (Sep. 2003).

3rd Generation Partnership Project, Technical Specification Group Services and Systems Aspects, Network Architecture (Release 6) 3GPP TS 23.002 V6.8.0 (Jun. 2005).

3rd Generation Partnership Project, Technical Specification Group Radio Access Network, User Equipment (UE) radio transmission and reception (FDD) (Release 6) 3GPP TS 25.101 V6.8.0 (Jun. 2005).

3rd Generation Partnership Project, Technical Specification Group Radio Access Network, User Equipment (UE) radio transmission and reception (TDD) (Release 6) 3GPP TS 25.102 V6.1.0 (Jun. 2005).

3rd Generation Partnership Project, Technical Specification Group Radio Access Network, Base Station (BS) radio transmission and reception (FDD) (Release 6) 3GPP TS 25.104 V6.9.0 (Jun. 2005).

3rd Generation Partnership Project, Technical Specification Group Radio Access Network, Base Station (BS) radio transmission and reception (TDD) (Release 6) 3GPP TS 25.105 V6.2.0 (Dec. 2004).

3rd Generation Partnership Project, Technical Specification Group Radio Access Network, Physical channels and mapping of transport channels onto physical channels (FDD) (Release 6), 3GPP TS 25.211 V6.5.0 (Jun. 2005).

3rd Generation Partnership Project, Technical Specification Group Radio Access Network, Multiplexing and channel coding (FDD) (Release 6), 3GPP TS 25.212 V6.5.0 (Jun. 2005).

3rd Generation Partnership Project, Technical Specification Group Radio Access Network, Spreading and modulation (FDD) (Release 6) 3GPP TS 25.213 V6.3.0 (Jun. 2005).

3rd Generation Partnership Project, Technical Specification Group Radio Access Network, Physical layer procedures (FDD) (Release 6) 3GPP TS 25.214 V6.6.0 (Jun. 2005).

3rd Generation Partnership Project, Technical Specification Group Radio Access Network, Physical layer—Measurements (FDD) (Release 6) 3GPP TS 25.215 V6.3.0 (Jun. 2005).

3rd Generation Partnership Project, Technical Specification Group Radio Access Network, Physical channels and mapping of transport channels onto physical channels (TDD) (Release 6) 3GPP TS 25.221 V6.4.1 (Jun. 2005).

3rd Generation Partnership Project, Technical Specification Group Radio Access Network, Multiplexing and channel coding (TDD) (Release 6 ) 3GPP TS 25.222 V6.2.0 (Dec. 2004).

3rd Generation Partnership Project, Technical Specification Group Radio Access Network, Spreading and modulation (TDD) (Release 6) 3GPP TS 25.223 V6.0.0 (Dec. 2003).

3rd Generation Partnership Project, Technical Specification Group Radio Access Network, Physical layer procedures (TDD) (Release 6) 3GPP TS 25.224 V6.5.0 (Jun. 2005).

3rd Generation Partnership Project, Technical Specification Group Radio Access Network, Physical layer, Measurements (TDD) (Release 6) 3GPP TS 25.225 V6.1.0 (Mar. 2004).

3rd Generation Partnership Project, Technical Specification Group Radio Access Network, FDD Enhanced Uplink, Overall description, Stage 2 (Release 6) 3GPP TS 25.309 V6.3.0 (Jun. 2005).

3rd Generation Partnership Project, Technical Specification Group Radio Access Network, Feasibility Study on Uplink Enhancements for UTRA TDD (Release 6) 3GPP TR 25.804 V2.0.0 (Feb. 2005).

3rd Generation Partnership Project, Technical Specification Group Radio Access Network, FDD Enhanced Uplink, Physical Layer Aspects (Release 6) 3GPP TR 25.808 V2.0.0 (Mar. 2005).

3rd Generation Partnership Project, Technical Specification Group Radio Access Network, Physical layer aspects of UTRA High Speed Downlink Packet Access (Release 4) 3GPP TR 25.848 V4.0.0 (Mar. 2001).

3rd Generation Partnership Project, Technical Specification Group Radio Access Network, Feasibility Study considering the viable deployment of UTRA in additional and diverse spectrum arrangements (Release 6) 3GPP TR 25.889 V6.0.0 (Jun. 2003).

3rd Generation Partnership Project, Technical Specification Group Radio Access Network, Feasibility Study for Enhanced Uplink for UTRA FDD (Release 6) 3GPP TR 25.896 V6.0.0 (Mar. 2004).

Communication Pursuant to Article 94(3) EPC from European Patent Application No. 06 792 532.1-1249 Dated Jan. 25, 2010.

Office Action dated Aug. 6, 2010 issued from Chinese Applciation No. 200680038351.5.

Notice of Decision of Final Rejection Dated Dec. 24, 2010 issued from Korean Patent Application No. 10-2008-7006990.

Notice Requesting Submission of Opinion (Preliminary Office Action) Dated Feb. 26, 2010 issued from Korean Patent Application No. 10-2008-7006990.

Translation of Office Action Dated Aug. 31, 2010 issued from Japanese Patent Application No. 2008-527415.

* cited by examiner

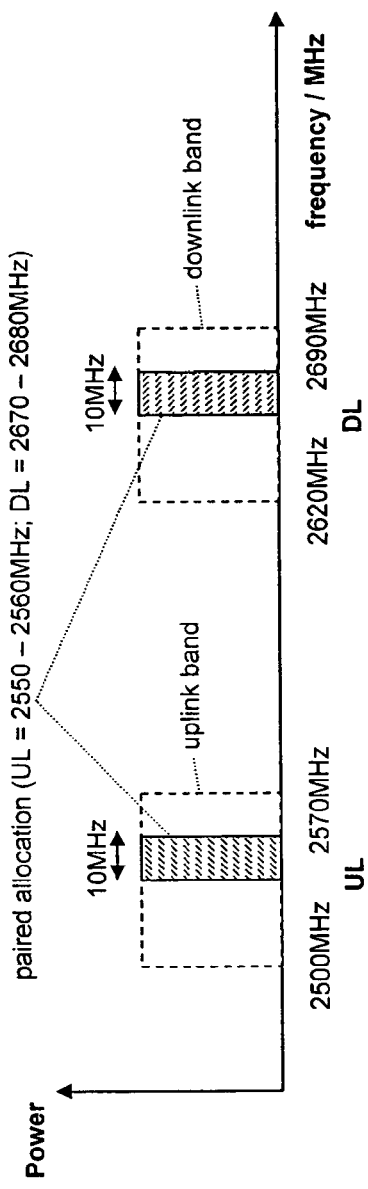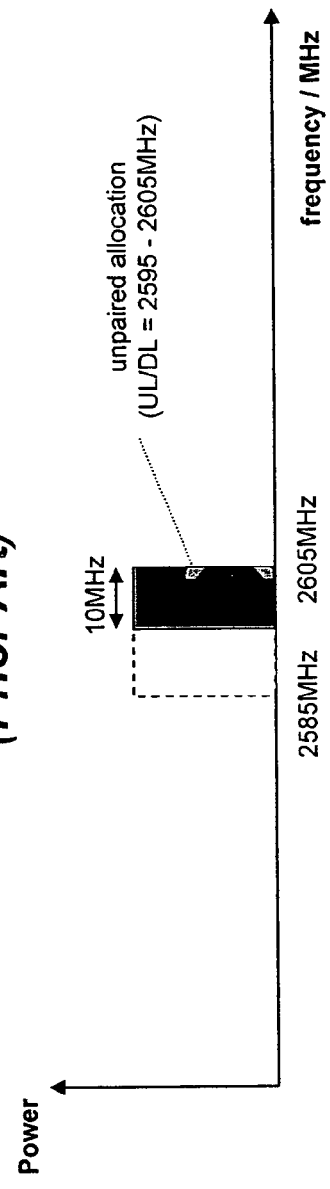

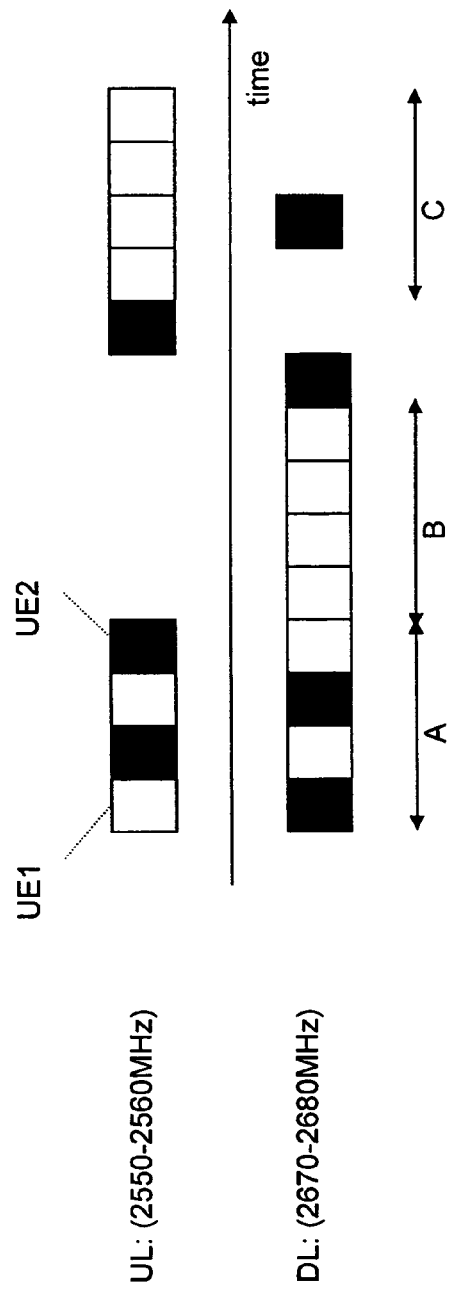
Fig. 5 *(Prior Art)*
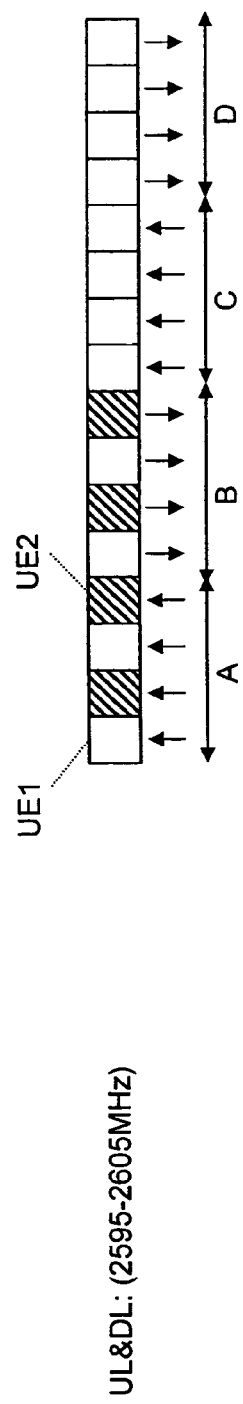
Fig. 6 *(Prior Art)*

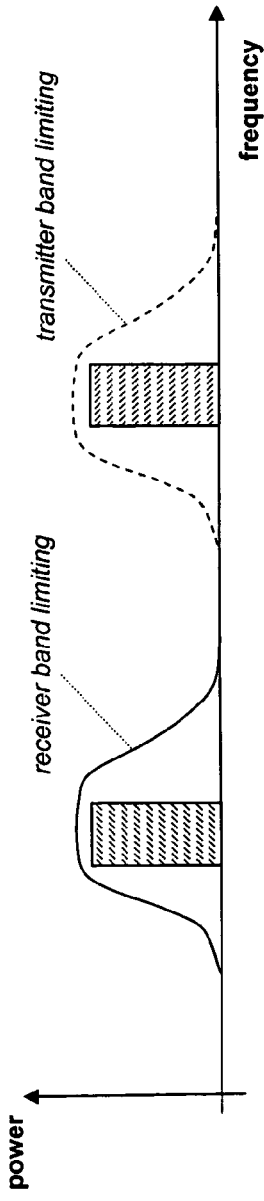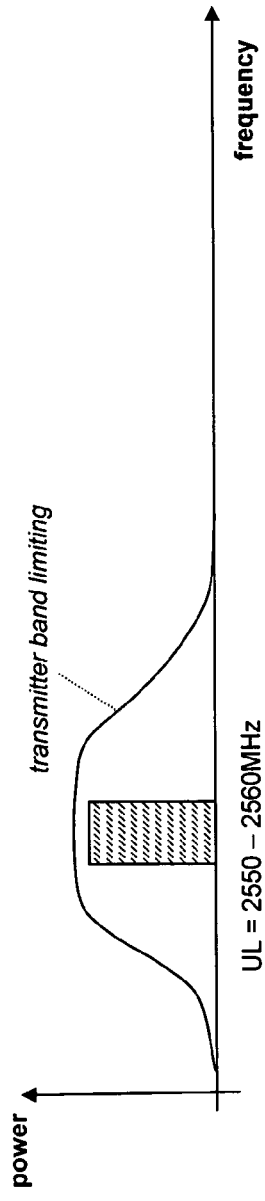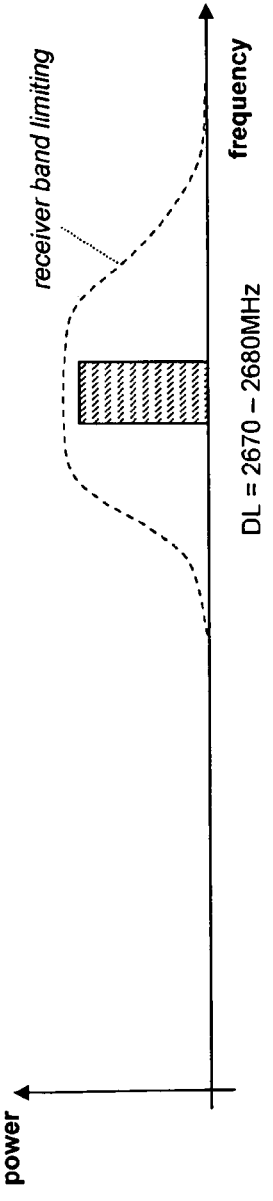
Fig. 8a (Prior Art)
Fig. 8b (Prior Art)
Fig. 8c (Prior Art)

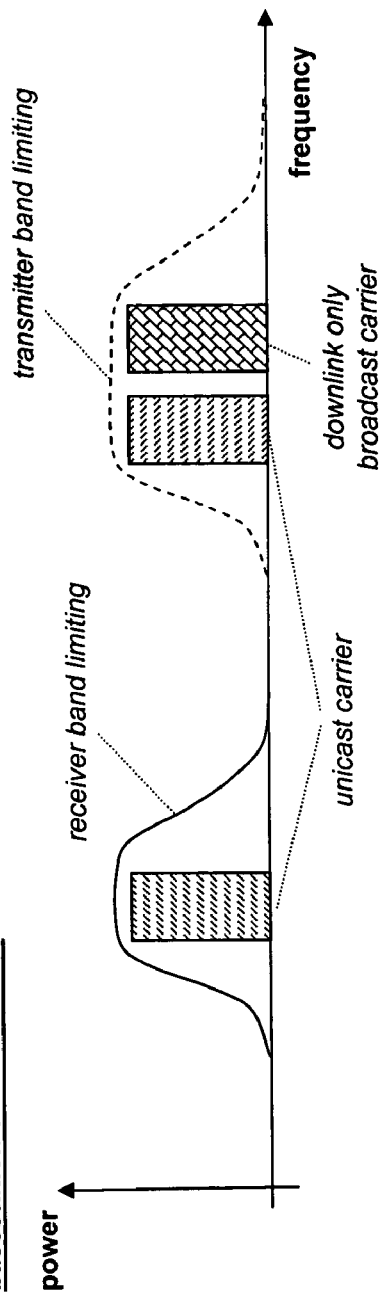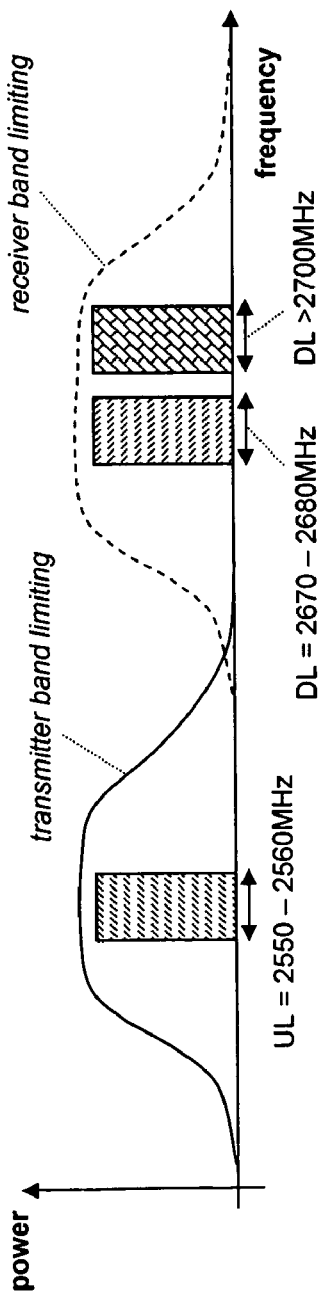

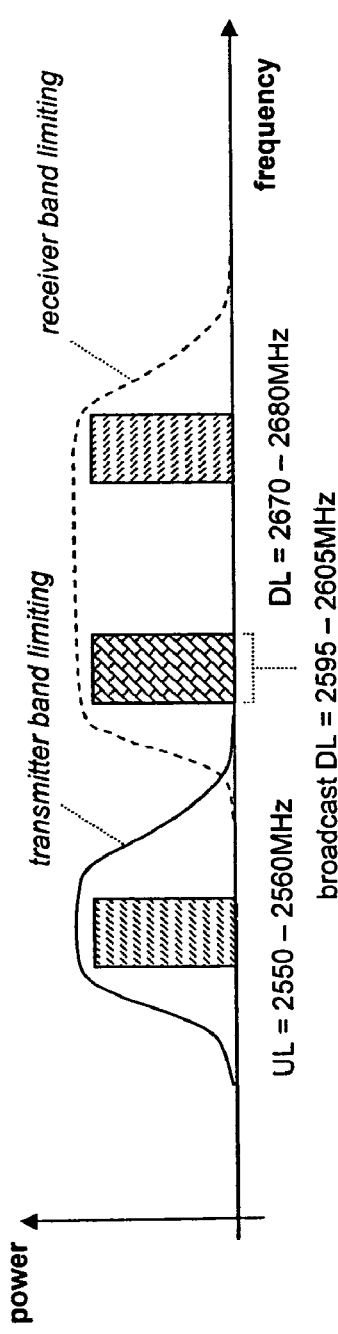
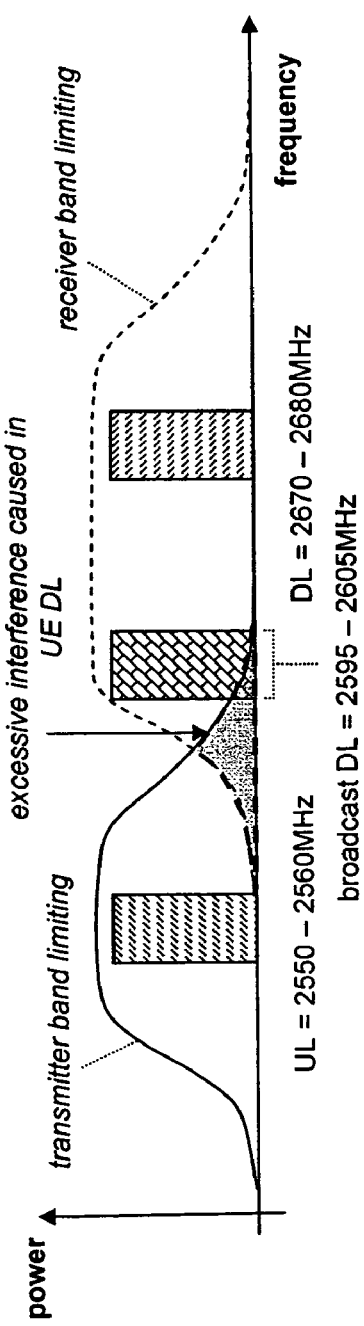
Fig. 13a
Fig. 13b

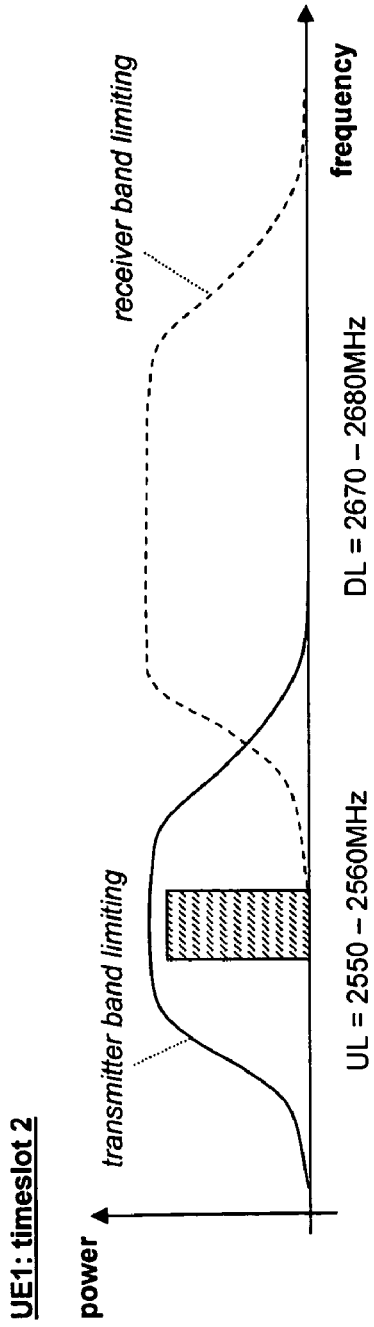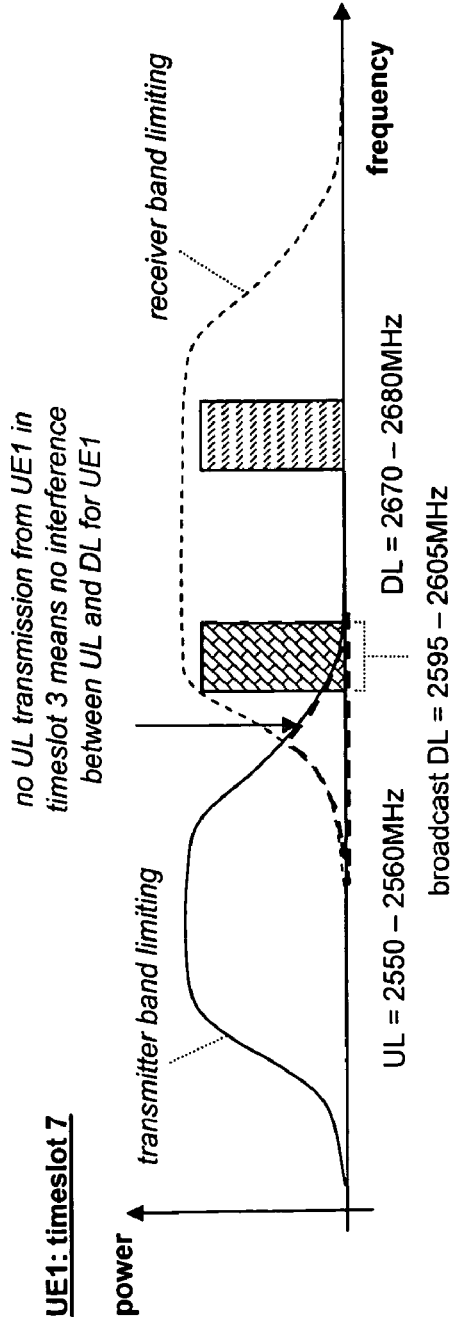
Fig. 19a
Fig. 19b

COMPATIBLE BROADCAST DOWNLINK AND UNICAST UPLINK INTERFERENCE REDUCTION FOR A WIRELESS COMMUNICATION SYSTEM

TECHNICAL FIELD

This invention relates to a method and apparatus for providing simultaneous broadcast and unicast services in a wireless communication system, with minimum interference between the services through scheduling of downlink unicast transmissions. The invention is applicable to, but not limited to, broadcast and unicast services as provided by the Universal Terrestrial Radio Access (UTRA) Wideband-CDMA system, as used in the Universal Mobile Telecommunication Standard (UMTS).

BACKGROUND OF THE INVENTION

Wireless communication systems, for example cellular telephony or private mobile radio communication systems, typically provide for radio telecommunication links to be arranged between a plurality of base transceiver stations (BTSs) and a plurality of subscriber units, often termed mobile stations (MSs).

Wireless communication systems are distinguished over fixed communication systems, such as the public switched telephone network (PSTN), principally in that mobile stations move among BTS coverage areas, and in doing so encounter varying radio propagation environments.

In a wireless communication system, each BTS has associated with it a particular geographical coverage area (or cell). The coverage area is defined by a particular range where the BTS can maintain acceptable communications with MSs operating within its serving cell. Coverage areas for a plurality of BTSs can be aggregated for an extensive coverage area. An embodiment of the present invention is described with reference to the Third Generation Partnership Project (3 GPP) defining portions of the Universal Mobile Telecommunication Standard (UMTS), including the time division duplex (TDD) mode of operation. 3GPP standards and technical release relating to the present invention include: (i) 3GPP TS25.346 v6.0.0 "Introduction of Multimedia Broadcast Service (MBMS) in the Radio access Network: Stage 2;" (ii) 3GPP TR25.889 "Feasibility Study Considering the Viable Deployment of UTRA in Additional and Diverse Spectrum Arrangements;" (iii) 3GPP TR25.896 v6.0.0"Feasibility Study for Enhanced Uplink for UTRA FDD;" (iv) 3GPP TR25.848 v4.0.0 "Physical Layer Aspects of UTRA High Speed Downlink Packet Access;" (v) R1-050464 "Physical Channel Structures for Evolved UTRA" (NTT DoCoMo) RAN1 meeting number 41; and (vi) R1-050654 "Principles of E-UTRA Simulcast" (Qualcomm Europe) RAN1 LTE Adhoc meeting, all hereby incorporated within this application, in their entireties by reference. 3GPP documents can be obtained from 3GPP Support Office, 650 Route des Lucioles, Sophia Antipolis, Valbonne, FRANCE, or on the Internet at www.3gpp.org.

In UMTS terminology, a BTS is referred to as a Node B, and subscriber equipment (or mobile stations) are referred to as user equipment (UEs). With the rapid development of services provided to users in the wireless communication arena, UEs can encompass many forms of communication devices, from cellular phones or radios, through personal data accessories (PDAs) and MP-3 players to wireless video units and wireless internet units.

In UMTS terminology, the communication link from the Node B to a UE is referred to as the downlink channel. Conversely, the communication link from a UE to the Node B is referred to as the uplink channel.

In such wireless communication systems, methods for simultaneously using available communication resources exist where such communication resources are shared by a number of users (mobile stations). These methods are sometimes termed multiple access techniques. Typically, some communication resources (say communications channels, time-slots, code sequences, etc) are used for carrying traffic while other channels are used for transferring control information, such as call paging, between the Node Bs and the UEs.

It is worth noting that transport channels exist between the physical layer and the medium access control (MAC) in the system hierarchy. Transport channels can define how data is transferred over the radio interface. Logical channels exist between MAC and the radio link control (RLC)/radio resource control (RRC) layers. Logical channels define what is transported. Physical channels define what is actually sent over the radio interface, i.e. between layer 1 entities in a UE and a Node B.

A number of multiple access techniques exist, whereby a finite communication resource is divided according to attributes such as: (i) frequency division multiple access (FDMA) in which one of a plurality of channels at different frequencies is assigned to a particular mobile station for use during the duration of a call; (ii) time division multiple access (TDMA) whereby each communication resource, say a frequency channel used in the communication system, is shared among users by dividing the resource into a number of distinct time periods (time-slots, frames, etc.); and (iii) code division multiple access (CDMA) whereby communication is performed by using all of the respective frequencies, at all of the time periods, and the resource is shared by allocating each communication a particular code, to differentiate desired signals from undesired signals.

Within such multiple access techniques, different duplex (two-way communication) paths are arranged. Such paths can be arranged in a frequency division duplex (FDD) configuration, whereby a frequency is dedicated for uplink communication and a second frequency is dedicated for downlink communication. Alternatively, the paths can be arranged in a time division duplex (TDD) configuration, whereby a first time period is dedicated for uplink communication and a second time period is dedicated for downlink communication on an alternating basis.

Present day communication systems, both wireless and wire-line, have a requirement to transfer data between communications units. Data, in this context, includes signaling information and traffic such as data, video, and audio communication. Such data transfer needs to be effectively and efficiently provided for, in order to optimize the use of limited communication resources.

In a wireless telecommunications network, two broad classes of data transmission are supported: broadcast and unicast transmission. Broadcast transmissions are point to multipoint transmissions carrying downlink data targeted at groups of users whereas unicast transmissions are point to point links that typically carry bidirectional data between a single user and the network.

A user of telecommunication services accesses the services via a user equipment (UE) and those services are supplied by basestations (also referred to as Node Bs). The basestations may be connected to network elements deeper within the telecommunications network (such as the radio network controller: RNC). Hence broadcast services are provided from a basestation to multiple UEs via a downlink radio link whereas unicast services are provided from a basestation to a single UE via a bi-directional radio link.

Example broadcast services include: (i) news bulletins; (ii) weather reports; (iii) traffic reports; (iv) financial reports; (v) live (or near-live) sports highlights or video clips; and (vi) radio programming of pop or classical music—to name a few.

Example unicast services include voice calls and data calls (typically used for internet or business applications).

A network operator would typically require a user to subscribe to services that the user is interested in (and willing to pay for) and might provide security keys to that user in order to allow that user to decode and decrypt services that that user has subscribed to.

Wireless networks transmit data on radio waves. The range of frequencies over which these waves are transmitted is termed the radio spectrum. Conventionally, the radio communication link between a base station and a mobile station is termed a downlink or "DL." The radio communication link between a mobile station and a base station is termed an uplink or "UL." Radio spectrum may be paired in separate bands for uplink and downlink service, or it may be unpaired, in which a common band is time-shared between uplink and downlink service or the band is used solely for either uplink or downlink.

Paired spectrum consists of a downlink carrier and an uplink carrier (each covering a range of frequencies in the vicinity of the carrier). Bidirectional services are supported in paired spectrum by modulating uplink transmissions onto the uplink carrier and downlink transmissions onto the downlink carrier: this mode of operation is termed frequency division duplexing. The downlink and uplink carrier are typically separated by a guard band. An example allocation of paired spectrum is shown in FIG. 1a. In this example, the uplink portion of the paired allocation is within the frequency range 2550-2560 MHz and the downlink portion is within the frequency range 2670-2680 MHz. This paired allocation could be used by a single operator for the support of unicast or broadcast services (the broadcast services would be supported within the downlink portion of the paired allocation). Note that the figure shows bands within which paired allocations can be made (a regulator might allocate the specific paired allocations within the bands). Hence, although a paired allocation for a single operator is shown in FIG. 1a, in fact multiple paired allocations can be supported in the uplink and downlink bands.

Unpaired spectrum consists of a single allocation of spectrum. Unpaired spectrum can be used for the support of both unicast and broadcast services. In order to support bidirectional services, unpaired spectrum is switched between uplink and downlink modes (to create a time division duplex as opposed to the frequency division duplex that is typically used with paired spectrum). Broadcast services may be supported in unpaired spectrum by assigning some of the downlink time periods to broadcast services: indeed, all time periods in the unpaired spectrum may be assigned to broadcast services in which case the unpaired spectrum becomes a downlink-only, broadcast-only carrier. Unpaired spectrum could alternatively be used as an auxiliary downlink for another paired or unpaired carrier, though this aspect is not considered further in this disclosure. An example allocation of unpaired spectrum is shown in FIG. 1b. This figure shows an allocation of unpaired spectrum in the frequency range 2595 to 2605 MHz.

Wireless equipment that can receive and transmit at the same time typically has its transmitter and receiver operating at different frequencies; hence such equipment is referred to as a full duplex (FD) equipment. In time-related terms, a FD UE can transmit and receive at the same time as shown in FIG. 2 because UL and DL are in separate frequency bands. During time period A, two FD UEs (UE1 as white squares and UE2 as black squares indicating respective UL and DL periods of activity) are shown. Each UE can transmit and receive data at the same time. In time period B, only UE1 receives and there is no UL transmission from either UE (hence an FD mode UE has the ability to operate with downlink and uplink at the same time, but is not required to operate in such a fashion). In time period C, UE1 transmits in the uplink and there is a transmission to UE2 in the downlink. More sophisticated systems employing CDMA, Orthogonal Frequency Division Multiple Access (OFDM) or other advanced techniques allow multiple UEs to transmit and receive at the same time.

Wireless equipment that can receive and transmit at the same time needs to contain circuitry to ensure that transmissions do not interfere with receptions. This piece of circuitry is commonly referred to as a duplexer 0305 in FIG. 3. The relevant front end circuitry within an FD mode UE is shown in FIG. 3 (an FD mode UE can receive and transmit at the same time). The transmissions from the power amplifier 0303 in the UE shown in FIG. 3 are ideally strictly band limited (if the UE were operating in the paired allocation shown in FIG. 1, then the uplink transmissions would ideally be strictly band-limited to the range 2550-2560 MHz). In reality, it is not possible to produce a low cost, efficient power amplifier that is strictly band limited and there will inevitably be leakage of transmission power outside the nominal transmit frequency range. In order to produce a sensitive receiver (that can receive transmissions at a low power e.g. from a distant basestation, often referred to as a low noise amplifier or LNA), it is important that the power from the uplink transmissions does not leak into the receiver, hence the requirement for the duplexer. It is also important that the transmissions from the transmitter do not saturate the receiver. The duplexer 0305 acts to pass the transmit signal from the PA 0303 to the antenna 0306, but to attenuate the signal that passes between the PA 0303 and the LNA 0304 and ensures that the transmit signal from the PA 0303 does not saturate the LNA 0304.

The signals that are received by the UE may be of a low level (operation with low level signals is required when the UE operates at a great distance from the basestation as may be the case in a cellular wireless telephony system). The duplexer further acts to ensure that these low level received signals (at the receive frequencies, such as 2670-2680 MHz in the paired allocation shown in FIG. 1*a*) are passed to the receiver with little attenuation, ensuring that low level signals from distant basestations can be reliably received by the UE. Hence, at the receive frequencies, there is little attenuation between antenna 0306 and the LNA 0304.

The transmit and receive frequency characteristics in the UE are therefore of the form shown in FIG. 4*a*. This figure shows the transmit and receive characteristics for the example paired allocation of FIG. 1. The transmission is band limited (0503 the envelope marked "transmitter band limiting"), such that transmit power is constrained to the transmit portion of the spectrum (to the extent possible within cost and power constraints) and the reception is band limited (0504 the envelope marked "receiver band limiting"), such that power is constrained to be received within the receive portion of the spectrum (again to the extent possible within cost and power constraints).

Operation of the front end circuitry in the basestation is conceptually similar to operation of the front end circuitry in the UE, but the basestation transmits in the downlink and receives in the uplink. The front end architecture in the basestation is thus similar to that shown in FIG. 3. The basestation is a fixed piece of equipment that is owned by a network operator (as opposed to the UE which is a mobile piece of equipment that is typically paid for by the subscriber—in one way or another). It is thus possible to implement higher cost and higher power components in the basestation (since there are fewer basestations, these base stations are mains powered and owned by corporations). Hence it is feasible to filter transmissions and receptions more aggressively in the basestation (using higher precision, though higher cost and higher power components). Hence the transmit and receive characteristics of a basestation may be superior (in a spectral sense) to those of the UE. The transmit and receive characteristics of the basestation may thus be as shown in FIG. 4b.

Half duplex mode operation can occur in paired or unpaired spectrum. For half duplex mode operation in paired spectrum UL transmissions occur on one frequency, DL transmissions occur on a different frequency. At the UE, the transmitter and receiver never operate together at the same time; at the basestation, the UE transmitter and receiver can operate together at the same time (i.e. the UE can operate in strict half-duplex mode and the basestation can operate in full-duplex mode). For half duplex mode in unpaired spectrum UL and DL transmissions occur on one (and the same) frequency. UL and DL transmissions are separate in time (via time division multiplexing). This mode of operation is typically referred to as time division duplex (TDD) operation.

FIG. 5 shows the time and frequency related aspects of half duplex mode operation in paired spectrum. During time period A, UE1 (white squares denoting activity) and UE2 (black squares denoting activity) operate bidirectional services. The basestation ensures that UE1 never needs to transmit and receive at the same time (hence it staggers the times at which UE1 has to transmit and receive). Similarly, UE2 is never required to transmit and receive at the same time. Note that by scheduling transmissions to UE1 and UE2 appropriately, all of the uplink and downlink resource can be used. During time period B, a unidirectional downlink service is applied to UE1. During time period C, a unidirectional uplink service is applied to UE1. Note that while this UE is being supplied with uplink service, downlink allocations to UE2 are possible. Note how in the figure shown the UE operates strictly in a half-duplex fashion, but the basestation operates in a full duplex fashion. Note again that for the sake of simplicity, a basic half-duplex scheme is shown, but in more advanced half-duplex transmission schemes (employing CDMA or OFDM technology), it is possible to serve multiple UEs at any one time: the rules remain the same however—an uplink transmission to a UE can never coincide with a downlink transmission to a UE.

FIG. 6 shows the time and frequency related aspects of half duplex mode operation in unpaired spectrum. In time periods A and B, bidirectional services are supported. UE1 and UE2 activity is denoted by white and hatched squares, respectively. The uplink portions of the bidirectional service are transmitted during time period A and the downlink portions of the bidirectional service are transmitted during time period B, as indicated by up and down arrows, respectively. In time period C, an uplink unidirectional service is applied to UE1. In time period D, a downlink unidirectional service is applied to UE1.

Note that a certain switching order between uplink and downlink is shown in FIG. 6, but this should not be considered to be prescriptive and in reality there are many different switching orders between downlink and uplink transmissions that can be applied. Note also that as for the FD and half-duplex mode in paired spectrum operation cases, only a simple system is shown where only a single UE transmits or receives at a single time instant, but in general multiple UEs can transmit in an uplink timeslot or multiple UEs can receive in a downlink timeslot when advanced techniques such as OFDM or CDMA are applied.

The UE architecture for a half duplex mode UE is simpler than that for a full duplex mode UE. A simplified diagram showing UE architecture is illustrated in FIG. 7. The half-duplex UE front-end architecture is considered to be simpler than the FDD UE front-end architecture as it does not contain a duplexer. Instead of the duplexer, the half-duplex UE contains a switch 0701 and transmit 0702 and receive 0703 bandpass filters. Note that in this architecture (and by virtue of the rules by which half-duplex UEs operate), there is no way for the UE's uplink transmissions to interfere with the UE's downlink receptions. The UE architecture of FIG. 7 may be used for either paired operation or unpaired operation.

The front-end architecture of a basestation operating in paired spectrum, serving half-duplex UEs, can be the same as that of the full-duplex basestation as shown in FIG. 3.

The front-end architecture of the basestation operating in unpaired spectrum can be similar to that of the UE shown in FIG. 7.

The frequency characteristics of the UE and basestation when operating in paired spectrum are shown in FIGS. 8a through 8c. FIG. 8a shows the basestation operating in full-duplex mode and FIGS. 8b and 8c show the UE operating in a strictly half-duplex fashion. As for the full duplex case, the basestation receiver and transmitter band limiting may be reasonably tight (due to the possibility to use higher precision and costlier components in the basestation than in the UE). FIGS. 8b and 8c illustrate UL and DL receiver characteristics of a UE, respectively. These are shown separately as the UE transmitter can never interfere with the UE receiver when operated in half-duplex mode (due to uplink and downlink transmissions always being separated in time).

The frequency characteristics of a UE operating in unpaired spectrum is shown in FIGS. 9a and 9b, respectively. The frequency characteristics of a basestation when operating in unpaired spectrum is shown in FIGS. 10a and 10b, respectively. This figure shows the basestation and the UE operating in half-duplex mode. It is possible neither in the basestation nor in the UE for the uplink transmissions to interfere with the downlink transmissions due to the orthogonality of these transmissions in the time domain.

3GPP has standardized the use of downlink resources for the transmission and reception of broadcast and multicast services. This system is referred to as the Multimedia Broadcast Multicast Service (MBMS). In this system, the broadcast traffic is either time multiplexed, code multiplexed, or time and code multiplexed with other traffic onto an existing carrier. In 3GPP, it has also been proposed to use unpaired spectrum as a standalone carrier for downlink MBMS data.

Unpaired spectrum is highly useful when operated as a standalone carrier carrying unicast data (such as internet and voice traffic). It is however also highly desirable to be able to use unpaired spectrum for the provision of downlink only broadcast services. When unpaired spectrum is used for a broadcast service it is typically paired in some loose sense with a bidirectional carrier. The bidirectional carrier may be used for signaling security information to allow the broadcast services to be decrypted and received or may be used to carry internet or voice traffic at the same time as the broadcast services (there are many possible other scenarios in which a bidirectional carrier and broadcast carrier may be used at the same time).

There are broadly two possible cases for the spectrum occupied by the downlink broadcast carrier: the broadcast carrier can occupy frequencies that are greater than those for the unicast downlink carrier (outside the duplex) or it can occupy frequencies between the unicast downlink carrier and the unicast uplink carrier (inside the duplex).

The case where the broadcast downlink carrier is outside the duplex spacing is shown in FIGS. 11a and b, for a basestation and UE, respectively. In this case, the broadcast downlink carrier is sufficiently separated from the uplink carrier that there is insignificant interference between the uplink carrier and the broadcast downlink carrier in the UE or basestation. Hence it is directly feasible to operate a broadcast downlink carrier outside the duplex of the paired unicast carrier with little additional complexity (the duplexer may need to have a wider passband for reception of both the unicast and downlink broadcast carriers).

Spectrum is a scarce resource and it is not always possible to ensure that the MBMS auxiliary downlink carrier is outside the duplex for the unicast carrier. For example it would be highly desirable to be able to use the unpaired spectrum allocation shown in FIG. 1b as an auxiliary MBMS downlink carrier is conjunction with a paired spectrum allocation such as that shown in FIG. 1a. However, use of unpaired spectrum as an auxiliary downlink broadcast carrier inside the duplex is much more problematic than the case where the auxiliary downlink broadcast carrier is outside the duplex. This issue is illustrated in FIGS. 12 and 13. FIG. 12 illustrates base station frequency characteristics. The transmit and receive filters for a base station can have tight specifications because of a relative lack of cost, size, and power constraints, compared with mobile stations. FIG. 13a illustrates transmit and receive filter characteristics having tight specifications for a mobile station, that has a high cost and power consumption. FIG. 13b illustrates more practical transmit and receive filter characteristics, showing excessive interference in the UE DL from the UE UL.

In order to reduce interference between uplink transmissions (of unicast data) and downlink broadcast transmissions, one approach is to tighten the requirements on the UE duplexer 0305 as shown in FIG. 3. The duplexer would need to reduce the range of frequencies that uplink transmissions spuriously create and would need to be more selective in terms of the frequencies that are allowed for reception (i.e. the UE receive filter would need to have a sharper roll-off). These tighter duplexer requirements lead to a higher cost, higher power consumption UE (higher precision components are typically more expensive and use more power). The frequency characteristics of this high cost, higher power consumption UE are shown in FIG. 13a.

A lower cost, lower power UE design would suffer from excessive interference into its downlink receiver whenever the UE uplink is used due to spurious emissions from the UE uplink not being sufficiently attenuated by the UE duplexer (note that the transmitter and receiver band limiting is not as tight for the low cost, low power UE shown in FIG. 13b—in comparison to the higher cost, higher power UEs shown in the FIG. 13a). This excessive interference will either increase the power required to supply downlink services to the UE (both broadcast and the downlink part of unicast services) or will reduce the coverage area of downlink services (both unicast and broadcast).

There is hence a need to be able to operate downlink broadcast services inside the duplex of a unicast carrier in a low cost and power efficient manner. The current invention provides a solution that meets this need.

Time multiplexing aspects of MBMS/E-MBMS (note E-MBMS is a term for enhanced MBMS: E-MBMS still supports multicast and broadcast services) with other services are shown in FIG. 14 (this is taken from R1-050654 "Principles of E-UTRA simulcast," incorporated by reference, above). This FIG. 14 shows that for an auxiliary downlink (on carrier f1), MBMS services are transmitted continuously (but there can be multiplexing between different services at different times). The figure also shows that a carrier can be time multiplexed between supporting MBMS and supporting unicast data (carrier f3). Note that in this figure, carriers f2, f3 and f4 are at the duplex spacing and carrier f1 is outside the duplex spacing.

Both broadcast data transmissions and unicast transmissions are scheduled to an extent in the background art. In MBMS (a 3GPP scheme for the transmission of broadcast data), the broadcast data (on the MBMS traffic channel—MTCH) can be scheduled. When MBMS data is scheduled, the network decides at which times various different MBMS services are going to be transmitted on different cells: this information is then signaled to UEs via an MBMS scheduling channel (MSCH). A UE may use the scheduling information carried on MSCH to reconfigure its receiver to receive MBMS transmissions from particular cells at particular time instants (if an MBMS transmission is transmitted at the same time from more than one cell, then the UE may find it advantageous to receive and combine the transmissions from these multiple cells). Scheduling of MBMS transmissions is described in 3GPP TS25.346 v6.0.0 "Introduction of the Multimedia Broadcast Multicast Service (MBMS) in the Radio Access Network (RAN); Stage 2," incorporated by reference, above. Note that in the background art, MBMS transmissions are not scheduled on the basis of MBMS services that UEs are decoding.

In 3GPP, both uplink and downlink unicast data may be scheduled. Unicast data is typically scheduled for packet based services (carrying for example internet traffic) and is not scheduled for circuit switched services (carrying for example voice traffic. Note: there may be a degree of scheduling for circuit switched services when call admission control (CAC) and dynamic channel allocation (DCA) techniques are considered). Aspects of scheduling for uplink and downlink unicast services are described in 3GPP TR25.896 v6.0.0 "Feasibility Study for Enhanced Uplink for UTRA FDD" and 3GPP TR25.848 v4.0.0 "Physical layer aspects of UTRA High Speed Downlink Packet Access," both incorporated by reference, above. These documents cover high speed uplink packet access and high speed downlink packet access (together termed high speed packet access: HSPA).

In HSPA, UEs are scheduled by the basestation according to parameters such as: (i) channel conditions; (ii) buffer volume (availability of data to transmit); (iii) estimated interference created in own and neighbor cells (this technique is especially applicable to high speed uplink packet access); (iv) fairness criteria; (v) quality of service attributes; and (vi) others.

SUMMARY OF THE INVENTION

Embodiments of the current invention reduce interference from a mobile station (UE) uplink transmission to a received broadcast downlink transmission through a network-based scheduling of time-slotted downlink broadcast transmissions, so that they do not occur concurrently with uplink transmissions The invention allows low cost, low power UEs to be designed and built by use of the following techniques: (i)

downlink broadcast transmissions are time-slotted; (ii) UEs operate either in half-duplex mode for transmission and reception of unicast services, or in full duplex mode where additional bandpass or additional highpass filtering can be applied to the DL unicast carrier; (iii) when unicast services are active for a UE, the UE informs the network of the broadcast services that are being decoded; and (iv) the network schedules unicast transmissions, broadcast transmissions, or both unicast and broadcast transmissions such that the uplink unicast transmission to a UE is never time-coincident with the broadcast transmissions to that UE.

The invention thus ensures that uplink transmissions from a UE never interfere with downlink broadcast transmissions to the UE that are inside the duplex spacing. Hence it is possible to design low cost, low power UEs that are able to receive downlink broadcast transmissions that use unpaired spectrum within the duplex spacing of a paired unicast carrier.

BRIEF DESCRIPTION OF THE DRAWINGS

FIG. 1a illustrates an example of paired spectrum.

FIG. 1b illustrates an example of unpaired spectrum.

FIG. 5 illustrates exemplary uplink and downlink activity timing for two mobile stations in a full duplex wireless communication system.

FIG. 6 illustrates exemplary uplink and downlink activity in a half duplex, time division duplex wireless communication system.

FIG. 8a illustrates exemplary transmitter and receiver filter characteristics for a base station.

FIG. 8b illustrates exemplary uplink, transmit filter characteristics for a mobile station.

FIG. 8c illustrates exemplary downlink, receiver filter characteristics for a mobile station.

FIG. 11a shows exemplary base station transmit and receive filter characteristics for a broadcast carrier occupying frequencies outside the duplex spacing.

FIG. 11b shows exemplary mobile station transmit and receive filter characteristics for a broadcast carrier occupying frequencies outside the duplex spacing.

FIG. 13a illustrates high cost, high power mobile station frequency characteristics with a broadcast carrier occupying frequencies inside the duplex spacing.

FIG. 13b illustrates low cost, low power mobile station frequency characteristics with a broadcast carrier occupying frequencies inside the duplex spacing.

FIG. 19a illustrates frequency/interference characteristics of an embodiment of the invention for exemplary timeslot 2 of FIG. 18.

FIG. 19b illustrates frequency/interference characteristics of an embodiment of the invention for exemplary timeslot 7 of FIG. 18.

DETAILED DESCRIPTION OF THE INVENTION

Unless defined otherwise, all technical and scientific terms used herein have the same meaning as is commonly understood by one of ordinary skill in the art to which this invention belongs. All patents, applications, published applications and other publications referred to herein are incorporated by reference in their entirety. If a definition set forth in this section is contrary to or otherwise inconsistent with a definition set forth in applications, published applications and other publications that are herein incorporated by reference, the definition set forth in this section prevails over the definition that is incorporated herein by reference.

As used herein, "a" or "an" means "at least one" or "one or more."

Half Duplex Mode Operation

In this section, half-duplex mode operation of the unicast services is considered. This section considers scheduling of unicast services, but broadcast services could alternatively be scheduled. When in idle mode, the UE is able to receive broadcast transmissions from the basestation. When in idle mode, the UE does not transmit in the uplink and hence there are no interference issues between unicast and broadcast transmissions. This operation is common to the background art.

Figure 2:
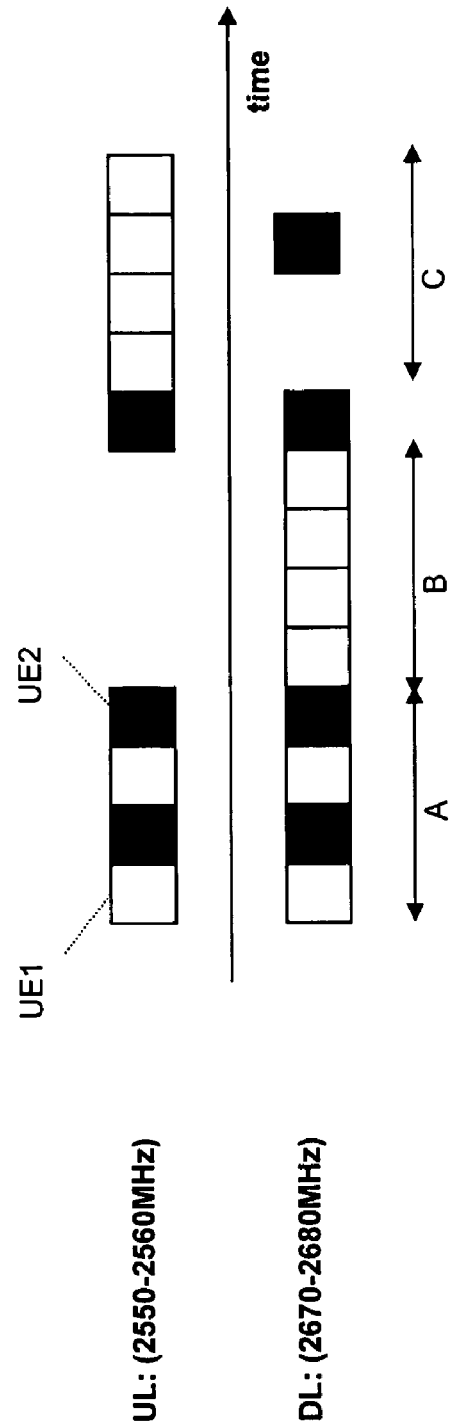
FIG. 2 illustrates the time sequenced operation of two mobile stations in a full duplex system.
Figure 3:
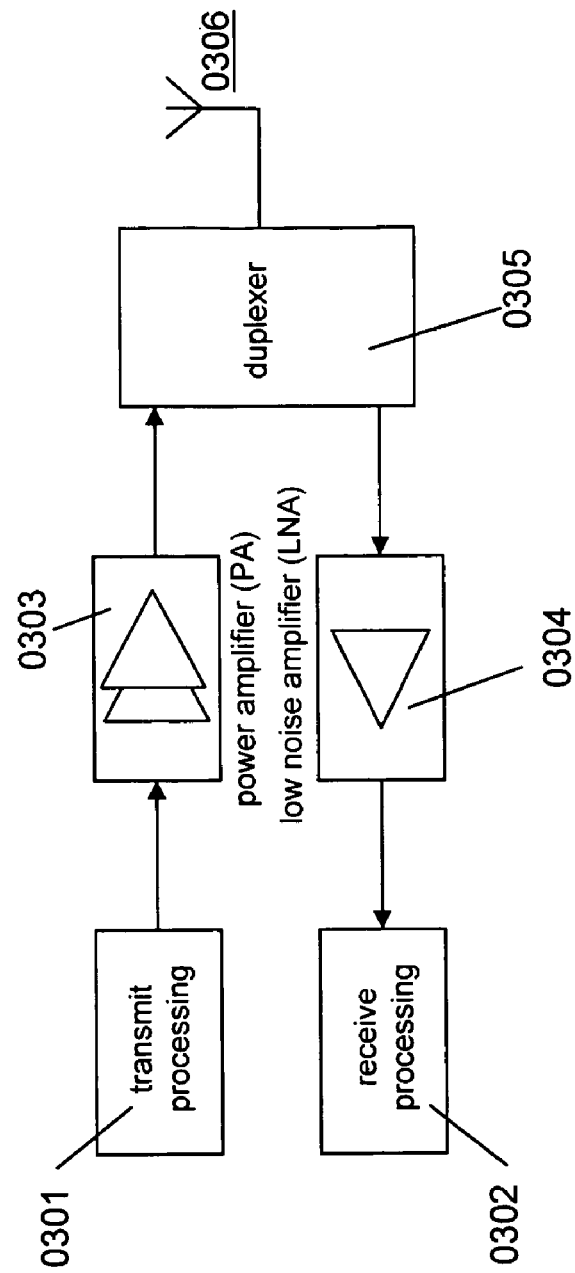
FIG. 3 is a block diagram of a mobile station or a base station transceiver.
Figure 4A:
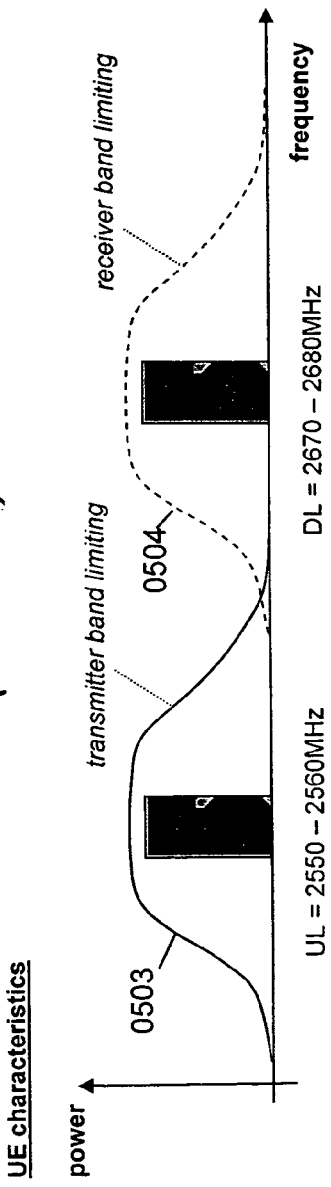
FIG. 4a shows exemplary transmit and receive filter envelopes for a mobile station.
Figure 4B:
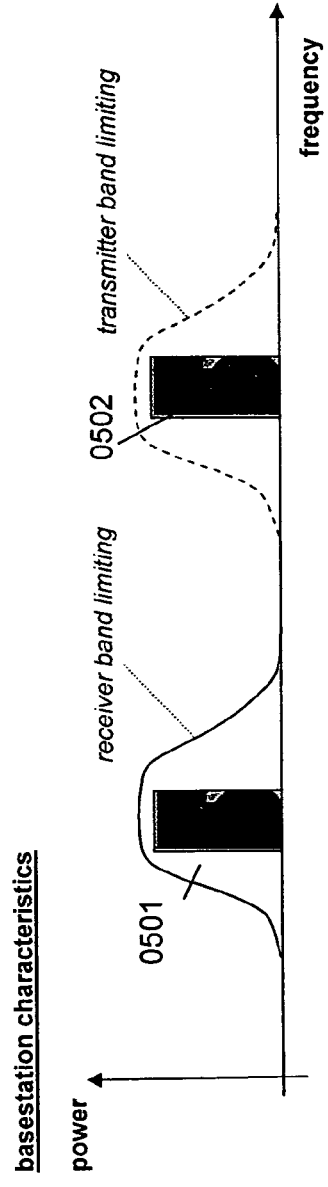
FIG. 4b shows exemplary transmit and receive filter characteristics for a base station.
Figure 7:
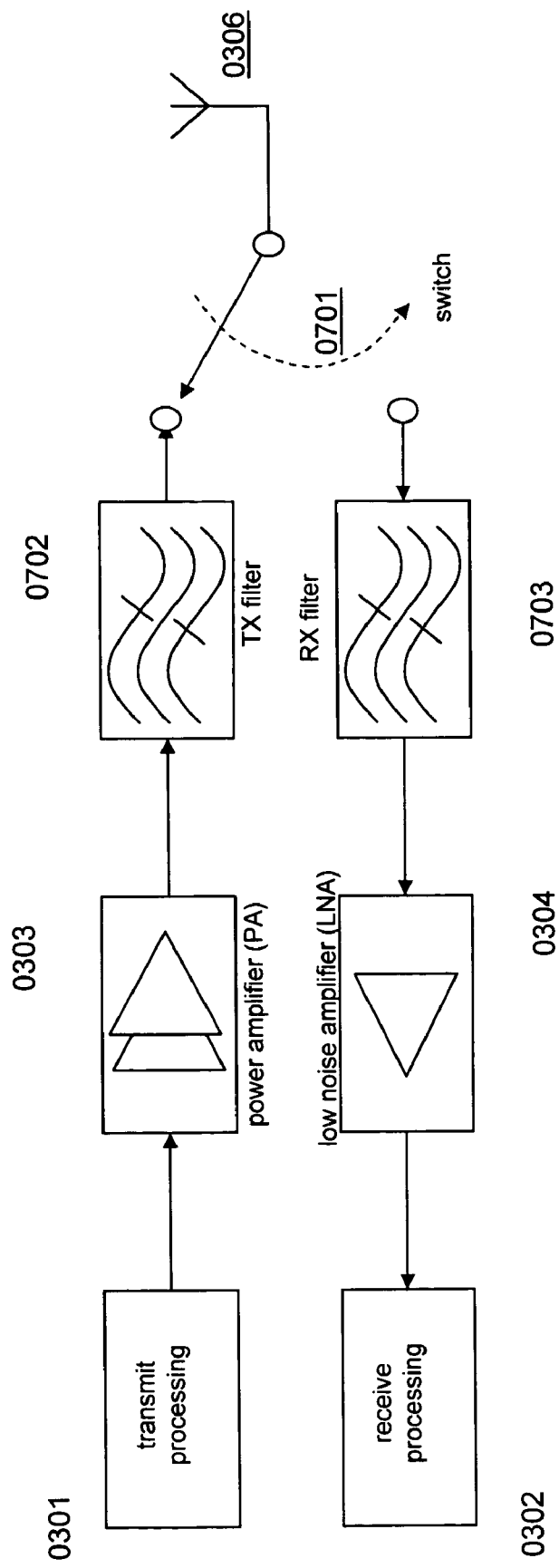
FIG. 7 is a block diagram of a mobile station or a base station transceiver with a transmit/receive switch, and separate transmit and receive filters.
Figure 9A:
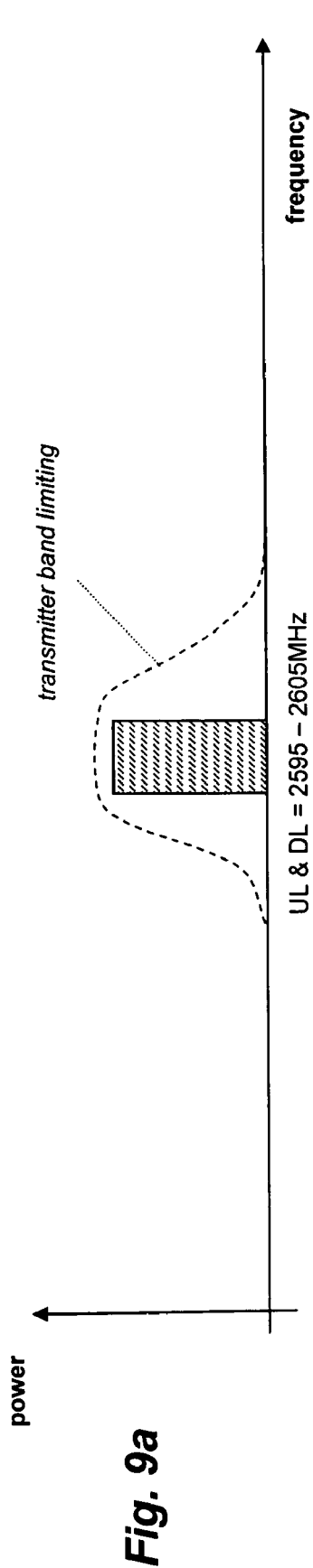
FIG. 9a illustrates an exemplary base station transmit, downlink filter characteristics for half duplex, time division duplex operation.
Figure 9B:
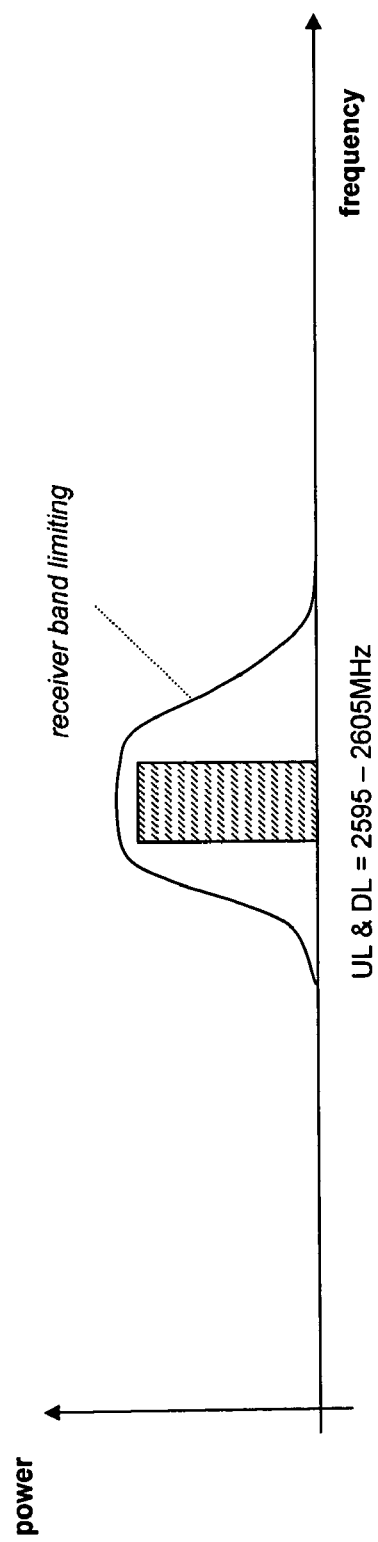
FIG. 9b illustrates an exemplary base station receive, uplink filter characteristics for half duplex, time division duplex operation.
Figure 10A:
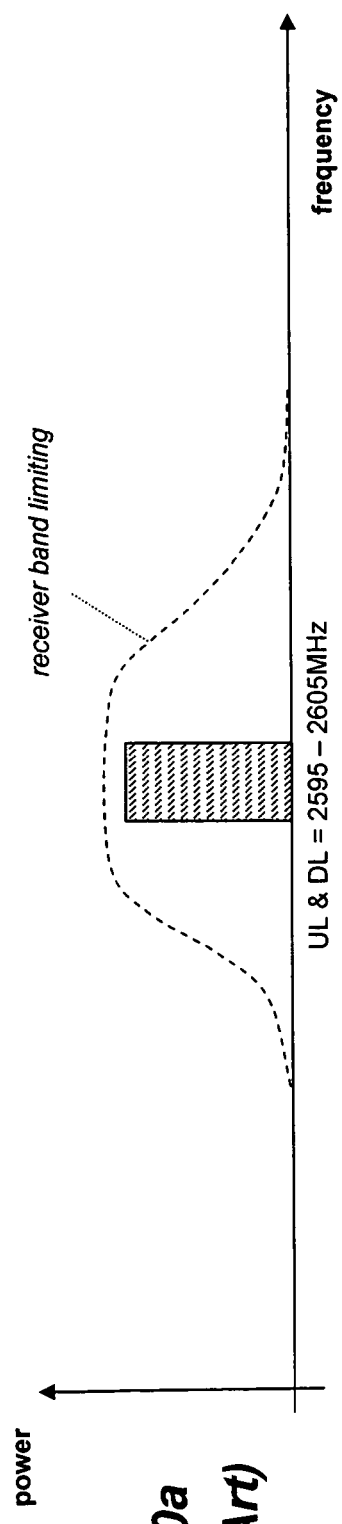
FIG. 10a illustrates exemplary UE characteristics with downlink transmissions active.
Figure 10B:
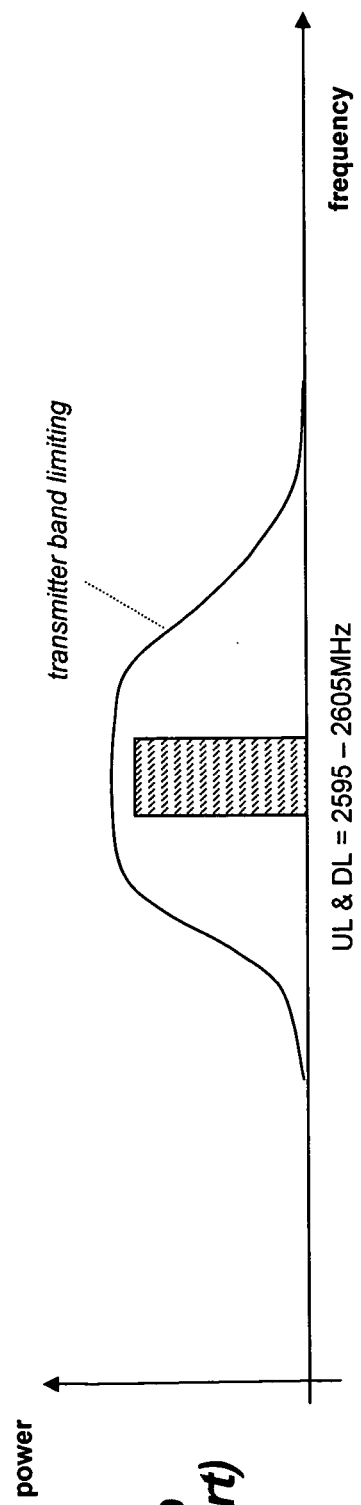
FIG. 10b illustrates exemplary UE characteristics with uplink transmissions active.
Figure 12:
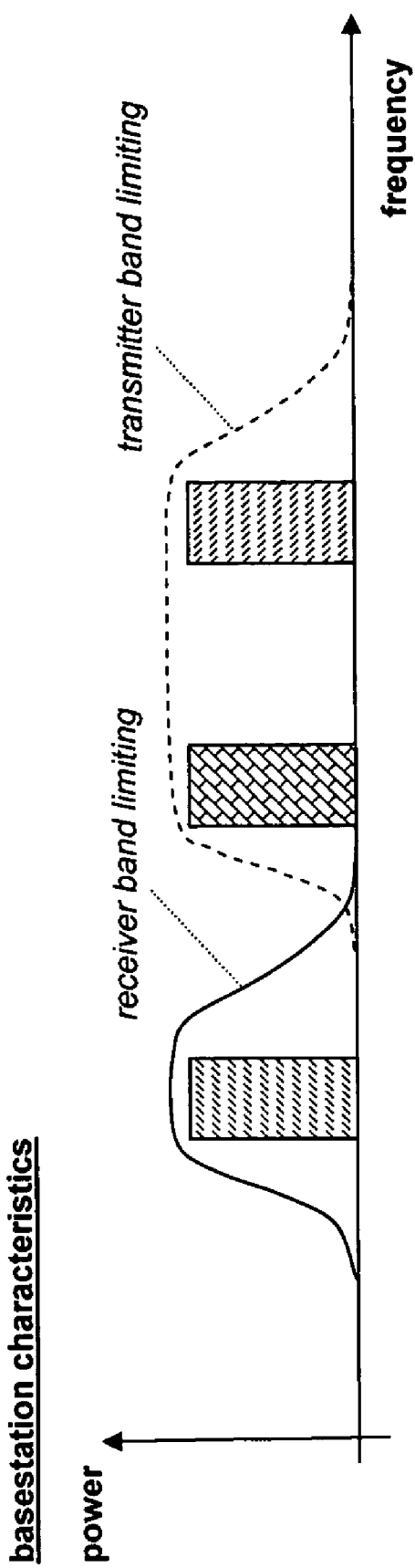
FIG. 12 shows exemplary base station frequency characteristics with a broadcast carrier occupying frequencies inside the duplex spacing.
Figure 14:
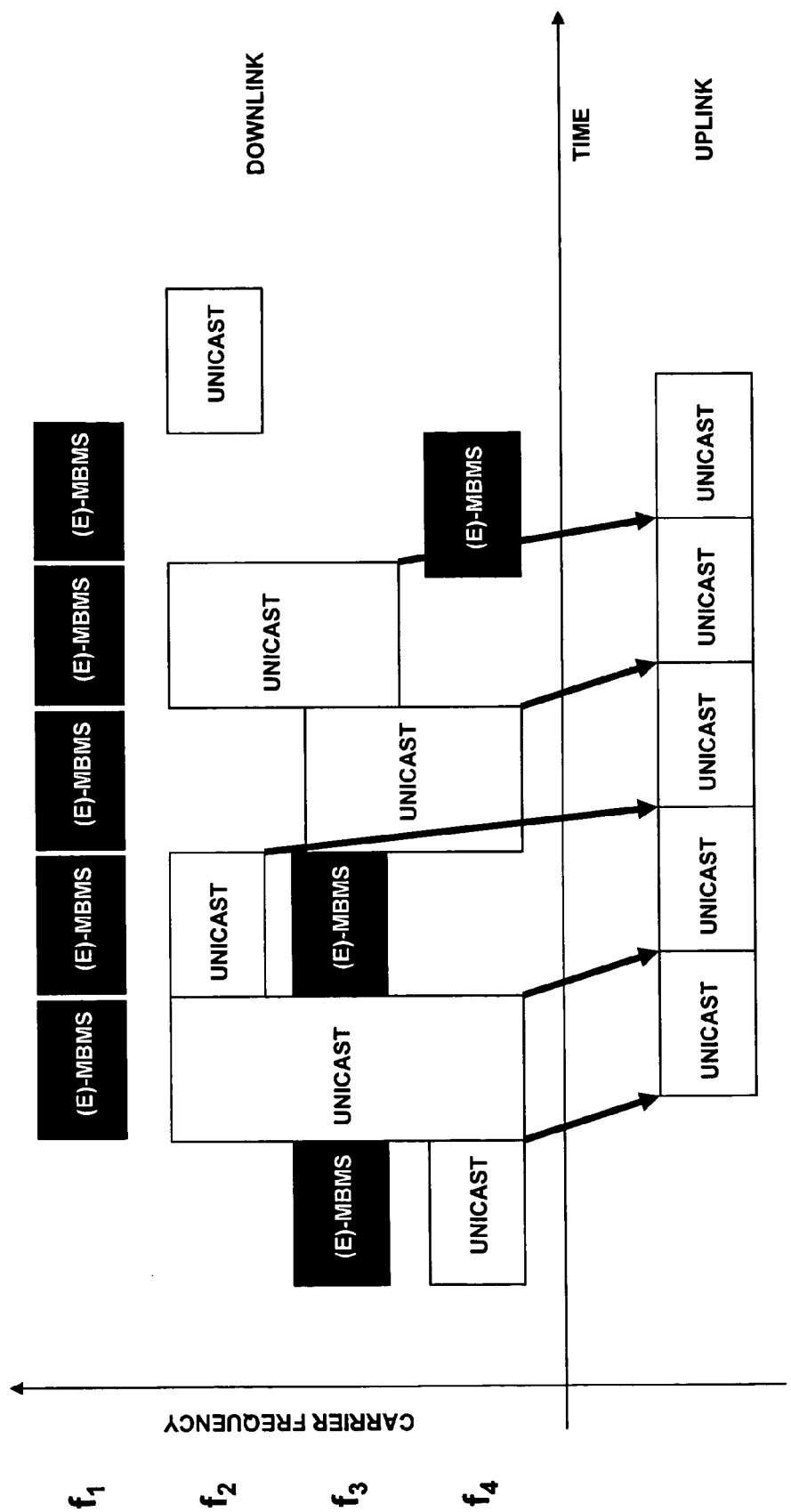
FIG. 14 illustrates time multiplexing aspects of MBMS.
Figure 15:
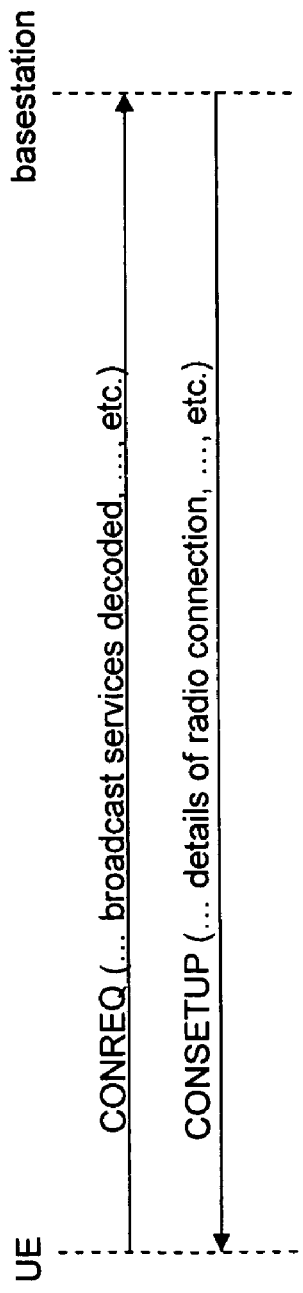
FIG. 15 illustrates a connection setup procedure wherein a mobile station transmits a list of broadcast services to a base station, according to an embodiment of the invention.
Figure 16:
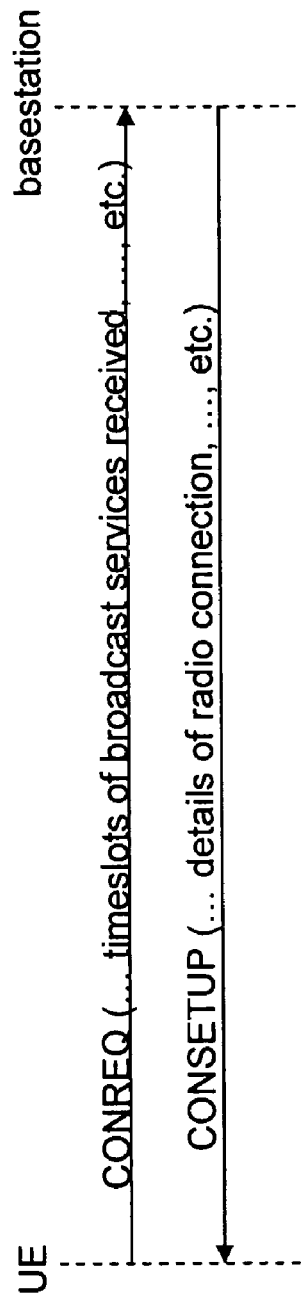
FIG. 16 illustrates a connection setup procedure wherein a mobile station transmits a list of broadcast timeslots decoded to a base station, according to an embodiment of the invention.

A unicast transmission can either be initiated by the network or by the UE. When the unicast transmission is initiated by the UE, it sends a "connection request" (referred to here as CONREQ) type message to the network where the CONREQ messages details the broadcast services that the UE is currently decoding—see FIG. 15 (or alternatively, the timeslots during which the UE is decoding broadcast messages: FIG. 16). The network then sends a "connection setup" (referred to here as a CONSETUP message) type message giving details of the radio connection that is set up. When the unicast transmission is initiated by the network, the signaling messages are similar to the UE-initiated case, but the UE may be initially paged by the network in order to wake it from an idle or low power state.

When sending a CONREQ message that details (amongst other things) the broadcast messages being received by the UE, interference between the transmission of the CONREQ message and reception of the broadcast transmissions is avoided when the CONREQ message is sent in a different timeslot to the timeslots on which the UE is decoding broadcast transmissions. The CONREQ message is typically a short message and it is alternatively possible to ensure that the transmission of the CONREQ message by the UE does not substantially interfere with the decoding of downlink broadcast transmissions. For example, when error correcting coding is applied to the broadcast transmissions and when the broadcast transmissions are interleaved over a greater time period (this time period is referred to as transmission time interval in 3GPP) than the CONREQ message, it is possible for the UE to transmit the CONREQ message and tolerate interference from that transmission into its receiver on the basis that the error correcting coding and interleaving will correct any potentially generated errors. In this example, the UE might alternatively and preferably not receive the downlink broadcast transmissions when transmitting the CONREQ message and allow the error correcting coding and interleaving to correct any punctured bits.

Having knowledge of the broadcast services that the UE is decoding, the network can deduce the timeslots (or more generally time periods) during which the UE is decoding broadcast transmissions (note that if the UE sends information on the timeslots that it is decoding broadcast transmissions then the network does not have to perform the translation between broadcast services and timeslots).

With knowledge of the timeslots during which the UE is receiving broadcast transmissions, the basestation schedules the UE with uplink resource only during timeslots that are neither used for downlink unicast transmissions to the UE nor for downlink broadcast transmissions on the broadcast carrier that the UE is decoding (as derived from the information in the CONREQ message).

During the extent of the broadcast transmission, if the UE changes the services that it is decoding (for example the user switches off reception of one of the broadcast services or the user/UE starts to receive another service [possibly in addition to reception of the previous service]), the UE informs the network of this change in status of broadcast reception via the ongoing unicast uplink transmission. If the network terminates transmission of a broadcast service (or the use of some timeslots for broadcast transmission), then the UE does not need to inform the network of this event (since the network is already aware that the broadcast transmission is being terminated).

Hence the UE status in terms of broadcast transmission decoding is sent to the network at the time of the initial connection request for unicast services and during ongoing unicast transmissions.

Figure 17:
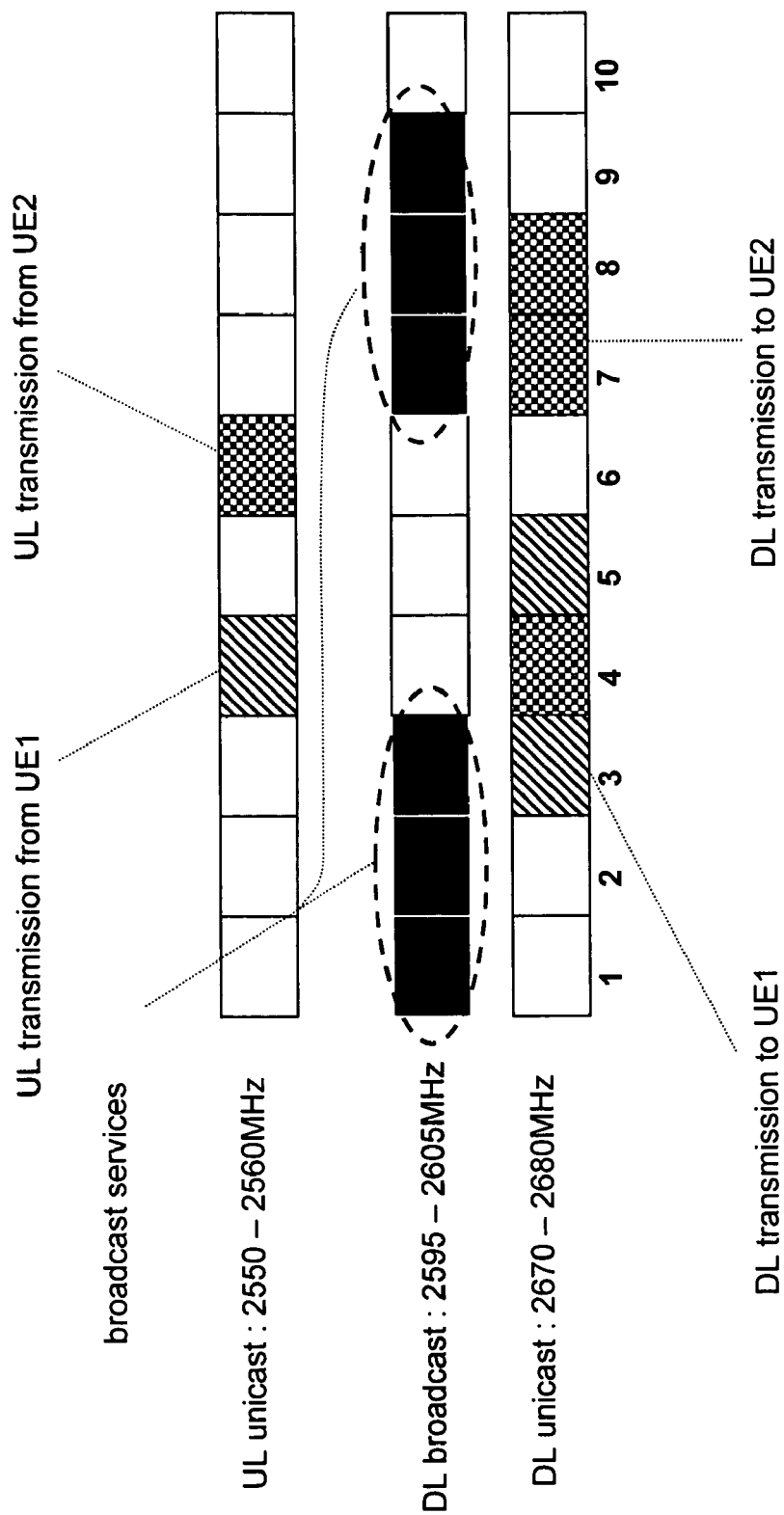
FIG. 17 illustrates an operation of an embodiment of the invention wherein a single broadcast service is received by two mobile stations.

FIG. 17 shows the case where two half duplex UEs are both decoding the same broadcast transmission (and the network has knowledge of that broadcast transmission by virtue of the CONREQ messages sent by both UEs). In this case, the network never allows the UE to transmit on the uplink when either the broadcast transmission is active or there is a downlink transmission to the UE. According to this figure, if all UEs decode the same broadcast service, the uplink will never be used in the timeslots allocated to the downlink. In this figure, UE1 and UE2 have the following transmit and receive profiles:

UE1: DL rx on timeslots 1,2,3,5,7,8,9; UL tx on timeslot 4
UE2: DL rx on timeslots 1,2,3,4,7,8,9; UL tx on timeslot 6

Note that this figure shows a case where the receiver is capable of simultaneous reception on two downlink carriers at the same time.

Figure 18:
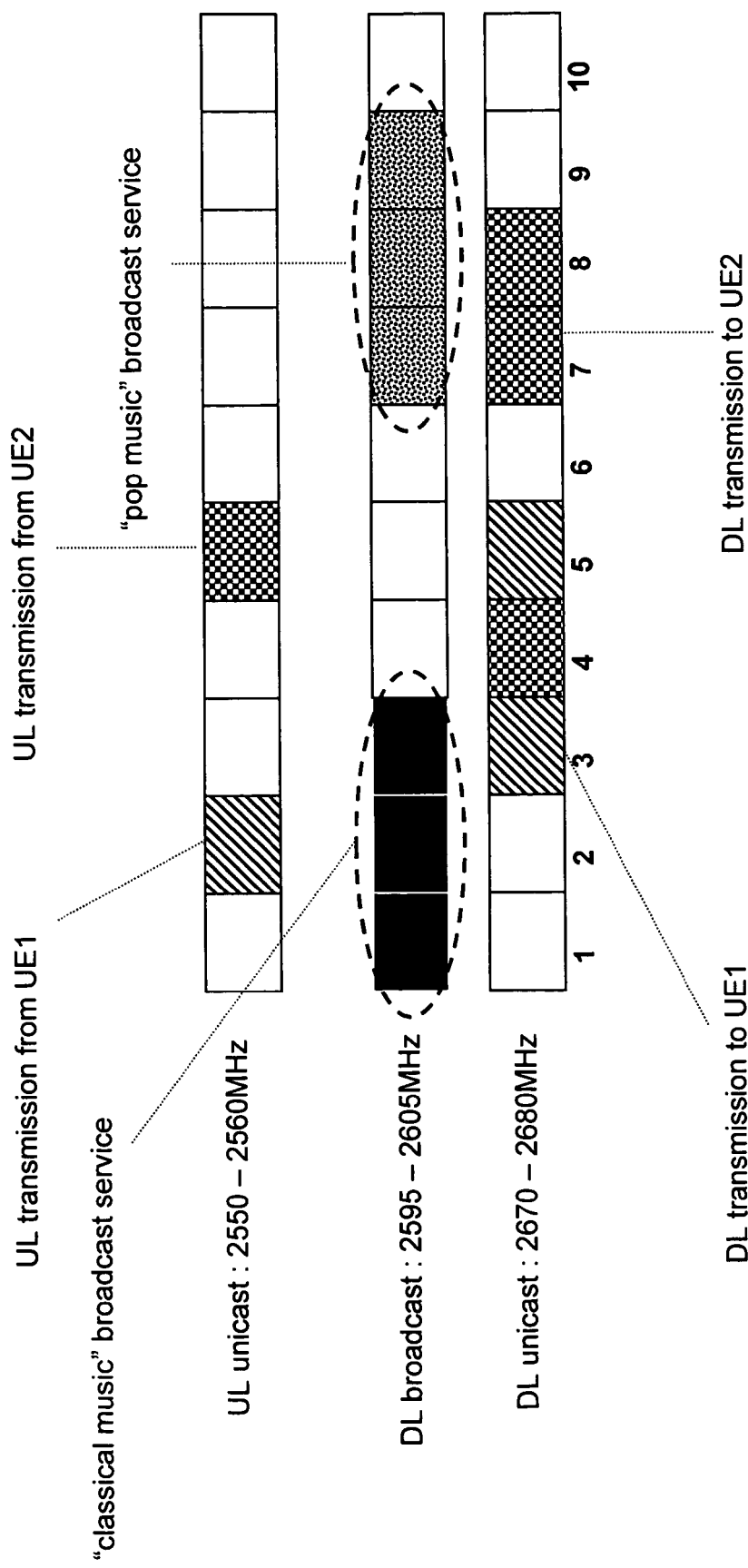
FIG. 18 illustrates an operation of an embodiment of the invention wherein two different mobile stations decode different broadcast services. UE1 decodes "pop," and UE2 decodes "classical".

FIG. 18 shows the case where the two UEs serviced by the network subscribe to different services (for example, UE1 decodes a broadcast "pop music" transmission and UE2 decodes a broadcast "classical music" transmission). In this case, the network never allows the UE to transmit on the uplink when either the broadcast transmission that the UE is decoding is active or there is a downlink transmission to the UE. This figure shows that when different UEs decode different broadcast services, it is possible to use all of the uplink timeslots (assuming that the various UEs are scheduled appropriately). In this figure, UE1 and UE2 have the following transmit and receive profiles:

UE1: DL rx on timeslots 3,5,7,8,9; UL tx on timeslot 2
UE2: DL rx on timeslots 1,2,3,4,7,8; UL tx on timeslot 5

Note that this figure shows a case where the receiver is capable of simultaneous reception on two downlink carriers at the same time.

FIGS. 19a and 19b shows the frequency and interference characteristics of the invention when operated in half-duplex mode (relating to the example timeslot activity of FIG. 18). FIG. 19a shows that in timeslot 2, there is no interference between the uplink transmission and the downlink transmissions since the downlink is not active for UE1 in timeslot 2. FIG. 19b shows that in timeslot 7, there is no interference between uplink transmissions and downlink transmissions since the uplink is not active in timeslot 7. Hence the figure shows that the combination of half-duplex operation and scheduling by the basestation ensure that there is no interference between uplink and downlink within the UE and hence the UE and network can operate with an auxiliary downlink carrier inside the duplex spacing with low cost, low power components at the UE.

In the previous portions of this section, scheduling of unicast data around fixed downlink broadcast carriers has been considered (i.e. the timeslots during which downlink broadcast transmissions are made does not change with the information sent to the network in the CONREQ message).

Figure 20:
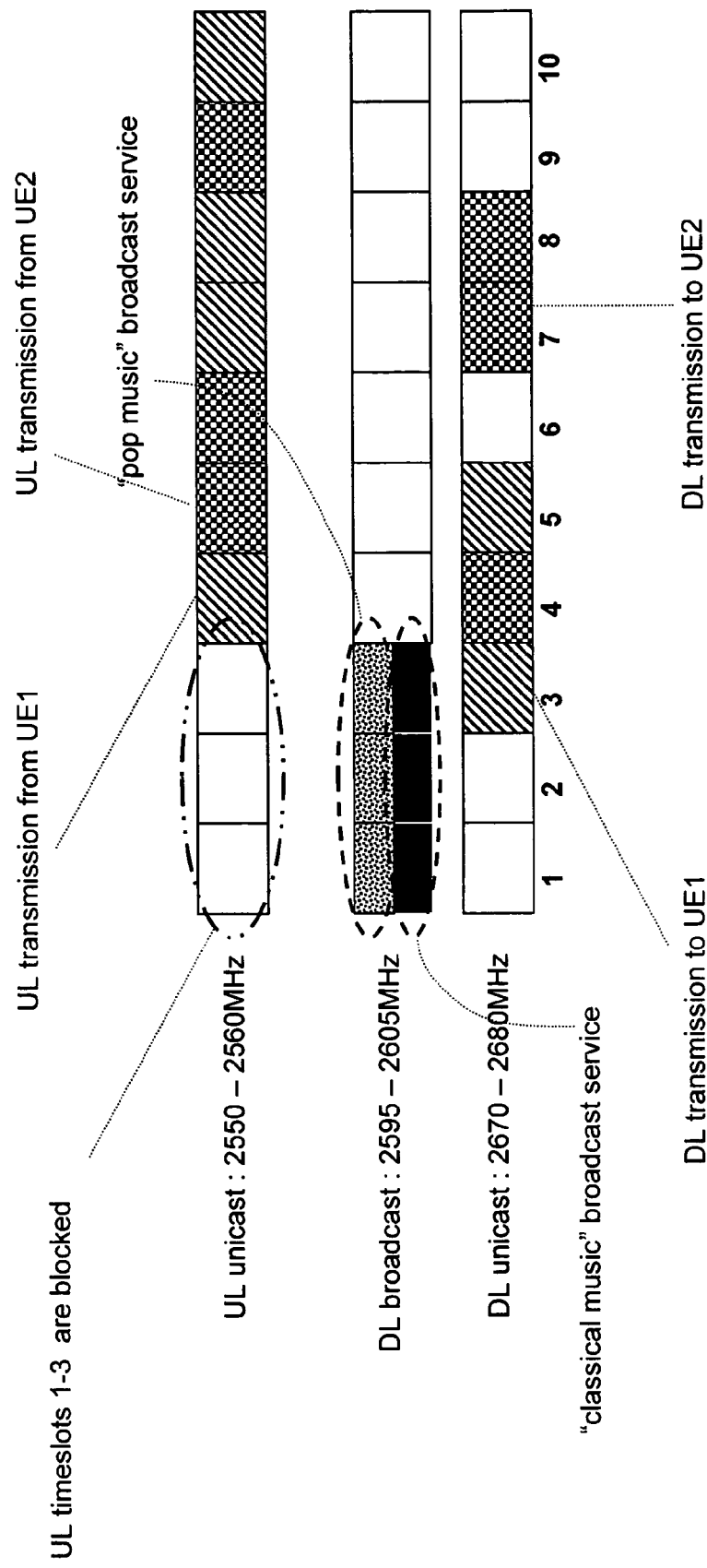
FIG. 20 illustrates an example of operation of an embodiment of the invention in which two different mobile stations decode different broadcast services on the same timeslot. UE1 decodes "pop," and UE2 decodes "classical."

For the low cost, low power UEs, it has already been identified that if all the UEs decode the same broadcast service, then the uplink carrier cannot be used during the timeslots when the broadcast carrier is active (FIG. 18). For the sake of simplicity, we have considered a system where only a single user or single broadcast service can be multiplexed onto a single timeslot, but we have noted that for more sophisticated systems (such as CDMA or OFDM based ones), multiple users or broadcast services can be multiplexed onto the same timeslot. When one of these more sophisticated transmission schemes is adopted, it is possible to multiplex more than one broadcast service onto a particular timeslot. Hence for the case where the "pop music" and "classical "music" broadcast services are both multiplexed onto the same timeslots, neither UE1 nor UE2 (of the example relating to FIG. 18) can transmit in the uplink during the downlink broadcast carrier timeslots: FIG. 20 (UE1 and UE2 are not allowed to transmit in the uplink in timeslots 1 to 3 since a transmission from UE1 would interfere with UE1's reception of the "pop music" service and a transmission from UE2 would interfere with UE2's reception of the "classical music" service). Hence, in the example of FIG. 20, the uplink unicast carrier is essentially blocked when the downlink broadcast carrier is active.

Figure 21:
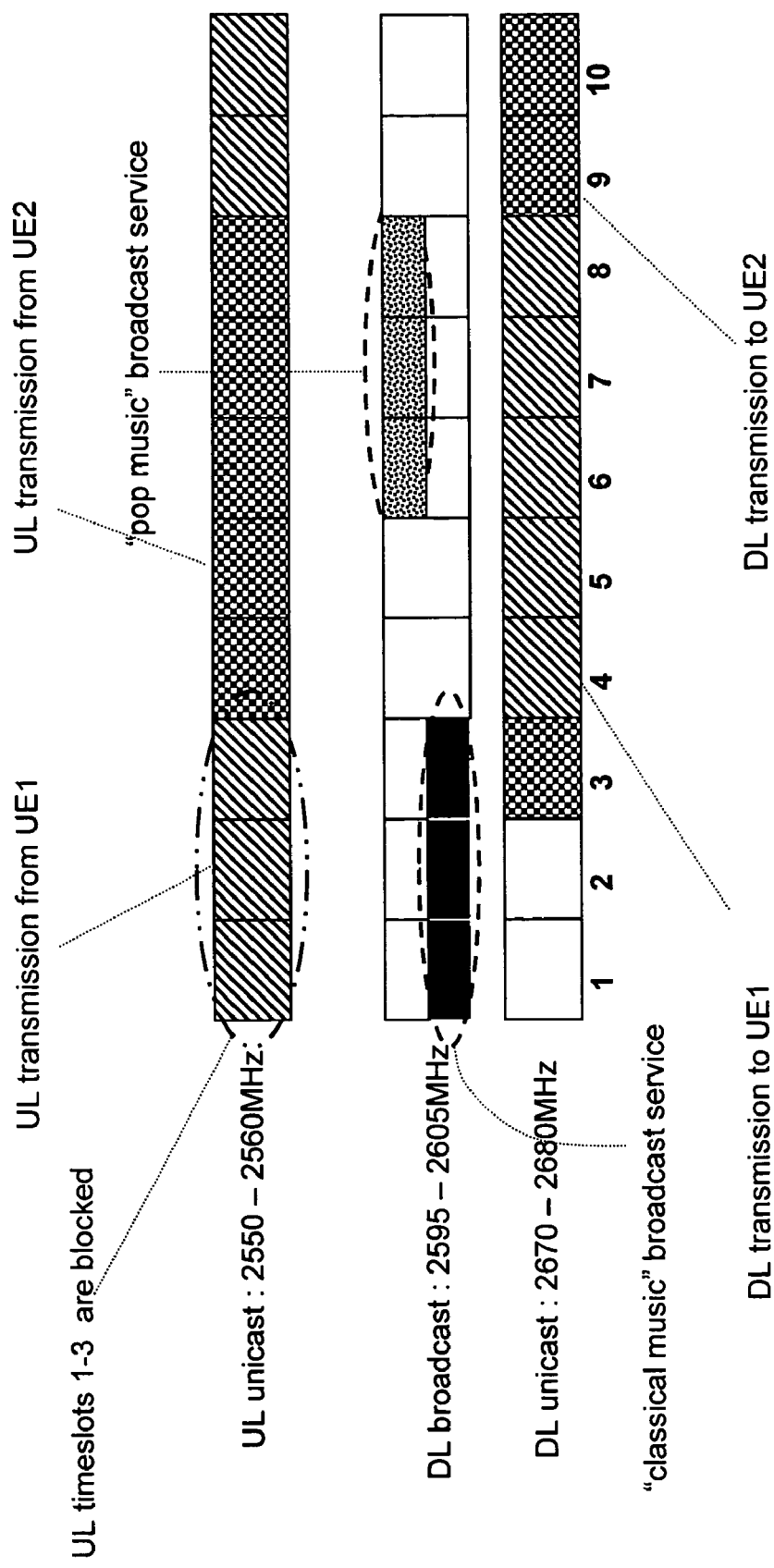
FIG. 21 illustrates an example of operation of an embodiment of the invention in which two different mobile stations decode different broadcast services on different timeslots. UE1 decodes "pop," and UE2 decodes "classical."

In the case shown in FIG. 20, a better strategy would be to schedule the downlink broadcast transmissions at different times (for example as shown in FIG. 21). When this approach is adopted, all of the uplink timeslots can be used by at least one UE (though there is a restriction that when the "pop music" service is active on the downlink broadcast carrier, UE1 cannot operate in the uplink and when the "classical music" service is active on the downlink broadcast carrier, UE2 cannot operate in the uplink).

The base station scheduler may use the broadcast reception status additionally to other metrics when scheduling UEs. The scheduler may thus schedule for a range of criteria such as broadcast reception status of the mobile station, fairness, channel quality, buffer volume, estimated incremental interference in neighboring base stations etc. For example, the base station may schedule UEs in the uplink according to a round-robin "equal throughput" fairness criterion that also takes into account broadcast reception status of the mobile station. In this case, the scheduler may provisionally schedule an uplink transmission to a UE according to the "equal throughput" fairness criterion, but then defer that scheduled transmission to a future frame or timeslot due to an impending broadcast transmission to the UE. In this way, UEs all receive a fair amount of scheduled uplink resource, but the times at which these scheduled uplink resources are active may change between frames or between timeslots.

Hence, the scheduler should be able to schedule the downlink broadcast carriers as well as the unicast carriers based on the contents of the CONREQ messages (note that this requirement also applies to the full-duplex case that will be discussed below).

Full Duplex Mode Operation

When operated in full-duplex mode, the connection request/connection setup procedure is the same as for the half-duplex case (the UE informs the network of the broadcast services that it is decoding; this information is updated when the broadcast services received changes and the UE has a unicast connection).

The auxiliary downlink broadcast carrier can be used with a full-duplex UE when: (i) there is sufficient filtering of the downlink unicast carrier in the UE for the unicast carrier to be separable from the downlink broadcast carrier (note that such filtering is generally required in any case); and (ii) the duplexer provides sufficient isolation between uplink and downlink to ensure that the downlink receiver is not blocked by the uplink transmissions (i.e. that the receiver is not driven into saturation or some other non-linear state such that it is no longer possible to receive any downlink transmission)

Figure 22:
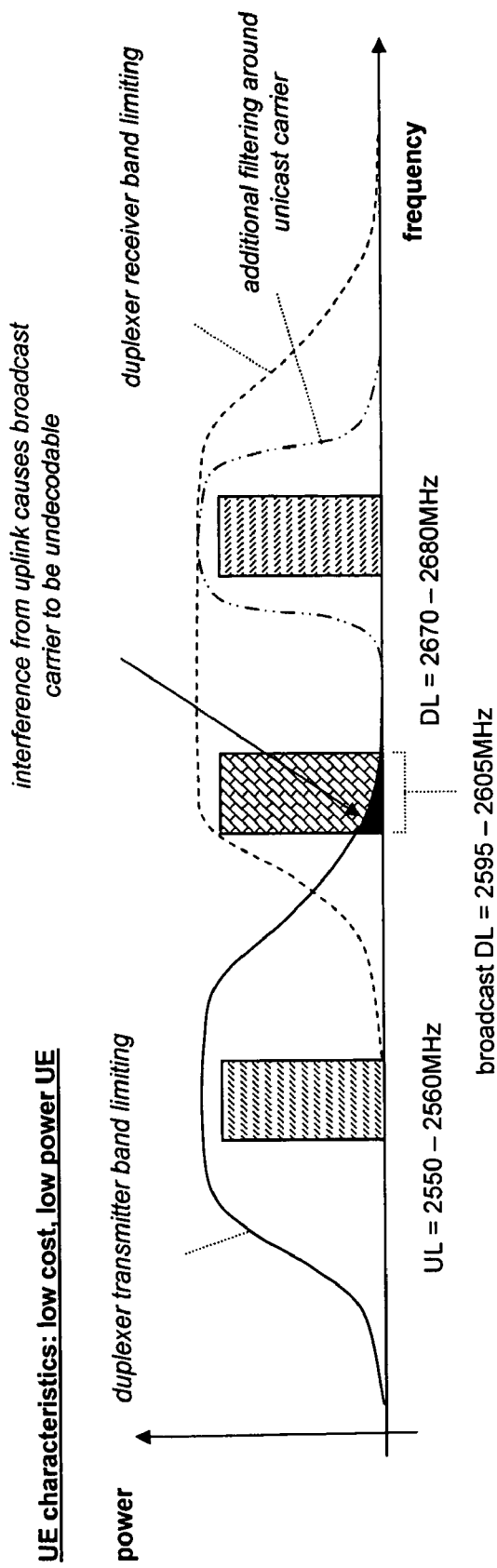
FIG. 22 illustrates a reception of unicast carriers in full duplex mode mobile stations.

When these conditions are met, it is possible to decode the downlink portion of a full-duplex unicast carrier even when there are transmissions from the UE on the unicast uplink carrier. This situation is illustrated in FIG. 22. This figure shows a full-duplex unicast transmission that is decodable by the UE due to a duplexer that does not block downlink transmissions when the UE uplink is active. Note that in this figure, it is not possible to receive the downlink broadcast carrier since there is leakage of transmit power from the UE transmitter into the bandwidth of the downlink broadcast carrier, harmfully reducing the signal to noise plus interference (SNIR) ratio of the broadcast downlink carrier at the UE.

In some embodiments, the scheduler schedules UEs with full-duplex unicast transmissions only at times (in timeslots) when the UE is not decoding downlink broadcast services (the UE indicates which downlink broadcast services it is decoding at the connection request phase).

Figure 23:
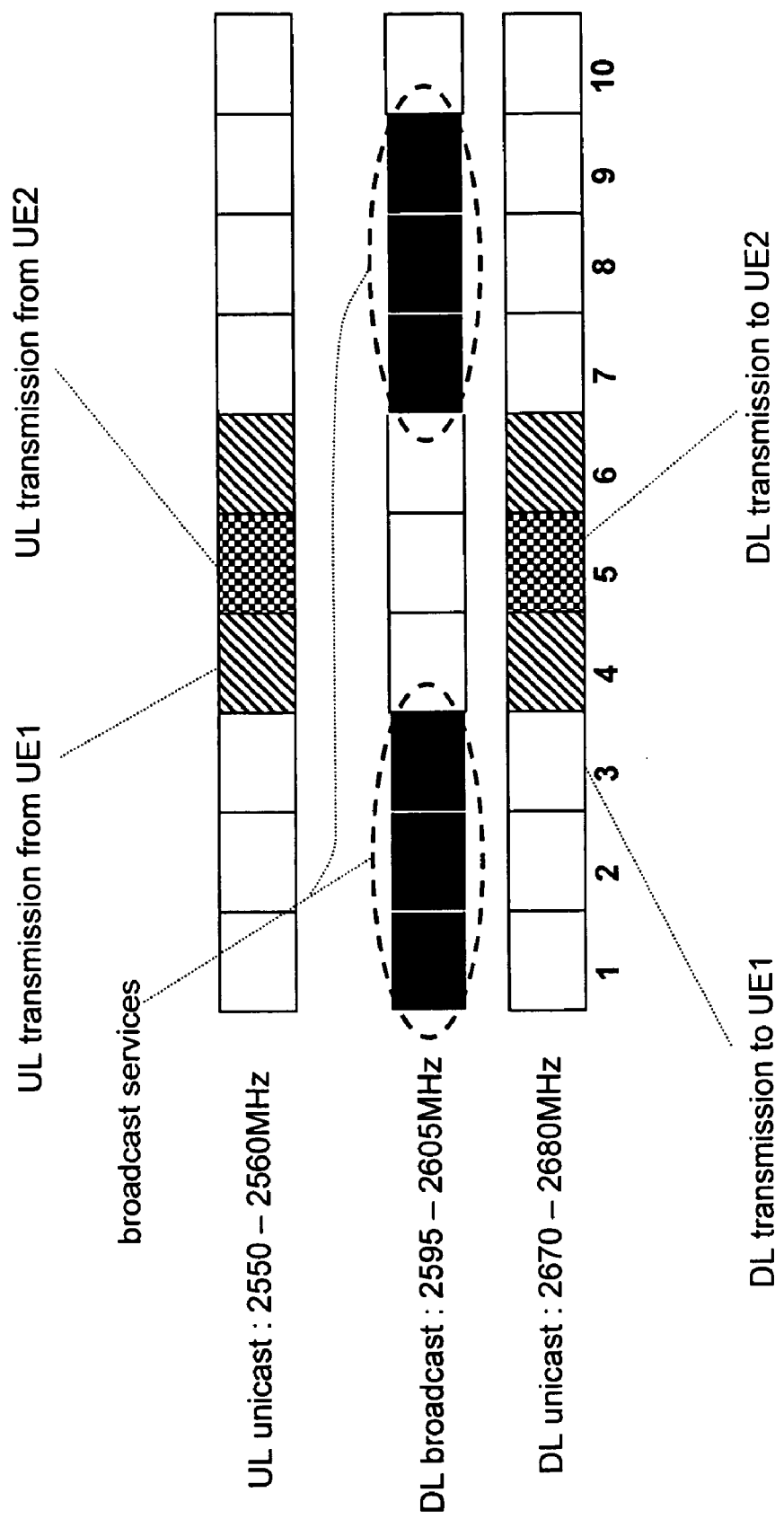
FIG. 23 illustrates an example of operation of an embodiment of the invention wherein a single broadcast service is received by two different mobile stations.

Full duplex operation according to the invention is illustrated in FIG. 23 for the case when two UEs both decode the same broadcast service. In this case, the basestation schedules full-duplex unicast transmissions to timeslots when broadcast transmissions are not active on the downlink broadcast carrier.

Figure 24:
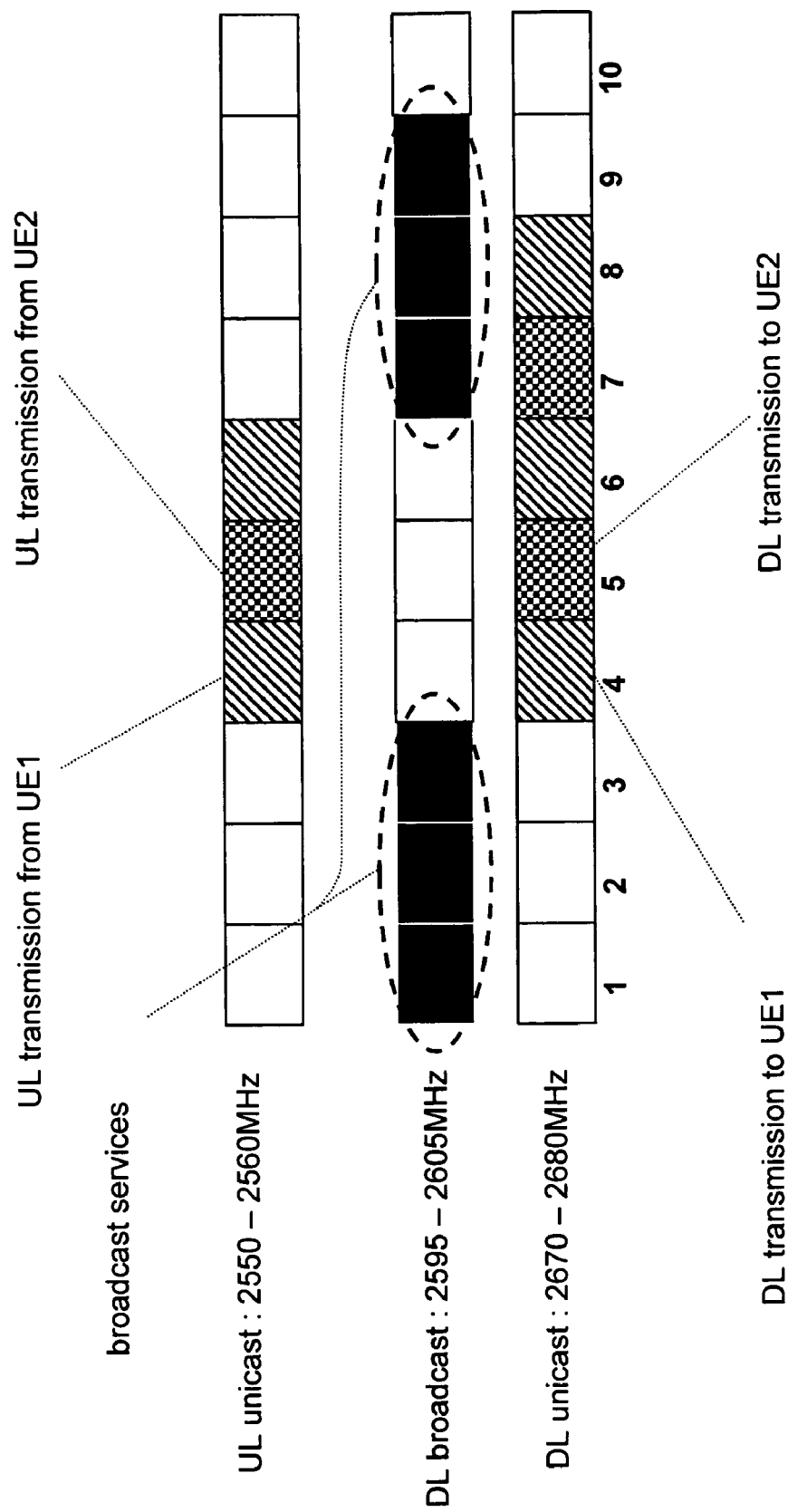
FIG. 24 illustrates an example of operation of an embodiment of the invention wherein a single broadcast service is received by two different mobile stations, along with an independent downlink unicast transmission.

Note that the case of full-duplex operation with all UEs decoding the same broadcast service is somewhat wasteful of full-duplex unicast and broadcast spectral resource (since the unicast transmissions and broadcast transmissions can never occur at the same time). It is possible to reduce the wastage of the full-duplex resource by just not allocating uplink resource during broadcast transmissions (i.e. the downlink carrier of the unicast transmission is active, but the uplink carrier does not transmit during the broadcast transmissions). This mode of operation is shown in FIG. 24.

Figure 25:
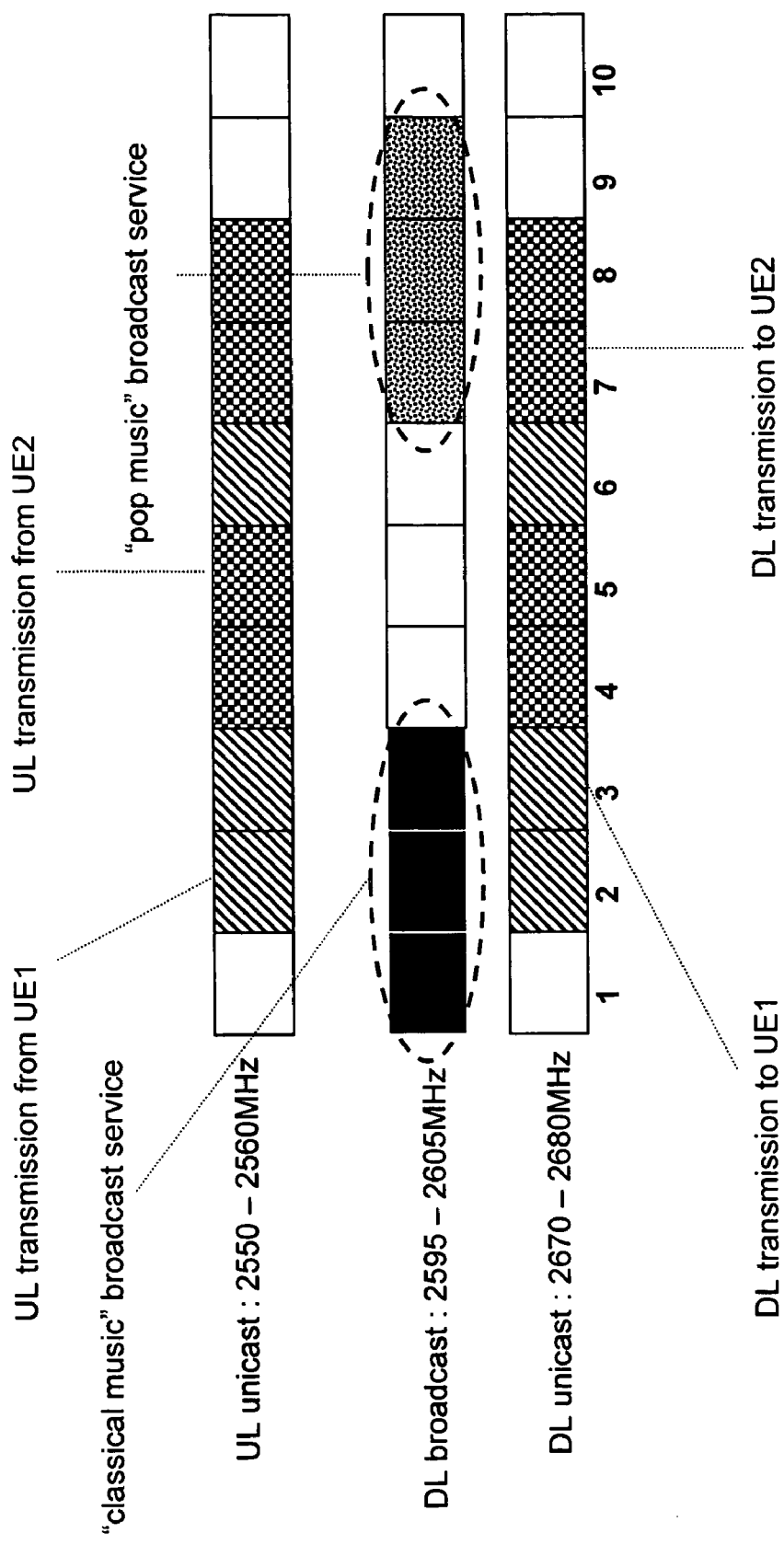
FIG. 25 illustrates an example of an operation of an embodiment of the invention in which two different broadcast services are received by two different, respective mobile stations. UE1 decodes "pop" and UE2 decodes "classical".

Usage of unicast and broadcast is more spectrally efficient when multiple UEs are present and those UEs decode different broadcast services. An example is shown in FIG. 25 where UE1 decodes a broadcast "pop music" transmission and UE2 decodes a broadcast "classical music" transmission). In this case, it is possible to transmit full-duplex transmissions to UE1 during any time when the broadcast "pop music" transmission is not active and it is possible to transmit full-duplex transmissions to UE2 during any time period when the broadcast "classical music" transmission is not active). This figure shows that a greater proportion of the unicast and broadcast timeslots can be used when different UEs decode different broadcast services.

Variations and extensions of the embodiments described are apparent to one of ordinary skill in the art.

Other applications, features, and advantages of this invention will be apparent to one of ordinary skill in the art who studies this invention disclosure. Therefore the scope of this invention is to be limited only by the following claims.

The invention claimed is:

1. A method for a base station to reduce interference between at least one uplink unicast transmission from at least one mobile station and at least one downlink broadcast transmission, comprising:
    assigning at least one time period to the at least one downlink broadcast transmission;
    transmitting at least one downlink broadcast service on the at least one time period;
    receiving information from the at least one mobile station identifying the at least one downlink broadcast service being decoded by the at least one mobile station; and
    scheduling the at least one uplink unicast transmission for transmission by the at least one mobile station, based on the identified at least one downlink broadcast service being decoded by the at least one mobile station, so that the at least one uplink unicast transmission of the at least one mobile station is never concurrent with the at least one downlink broadcast transmission that the at least one mobile station is decoding.

2. The method of claim 1, wherein the at least one uplink unicast transmission is given priority over the at least one broadcast transmission for scheduling.

3. The method of claim 1, wherein the at least one broadcast transmission is given priority over the at least one uplink unicast transmission for scheduling.

4. The method of claim 1, further comprising receiving information from the at least one mobile station relating to a change in the broadcast service being decoded by the at least one mobile station.

5. The method of claim 1, wherein the information identifying the at least one downlink broadcast service being decoded by the at least one mobile station comprises identifiers for the at least one downlink broadcast transmission.

6. The method of claim 1, wherein the information identifying the at least one downlink broadcast service being decoded by the at least one mobile station comprises time period indicia for the at least one downlink broadcast transmission.

7. The method of claim 1, wherein the at least one unicast transmission transmitted by the base station is part of a half duplex unicast transmission.

8. The method of claim 1, wherein the at least one unicast transmission transmitted by the base station is part of a full duplex unicast transmission.

9. The method of claim 1 further comprising scheduling a downlink unicast transmission in a third time period so that the at least one mobile station is capable of receiving a downlink unicast transmission in the third time period without causing interference to the at least one downlink broadcast transmission or the at least one uplink unicast transmission.

10. The method of claim 1 in which the base station schedules transmissions, based at least in part on at least one of (i) broadcast reception status of the at least one mobile station, (ii) fairness, (iii) channel quality, (iv) estimated incremental interference in neighbor cells, or (v) buffer volume.

11. A method for a mobile station to reduce interference between an uplink, unicast transmission from the mobile station and at least one downlink broadcast transmission, comprising:
receiving at least one downlink broadcast service on the at least one downlink broadcast transmission in an at least one assigned time period from a base station;
transmitting information to the base station identifying the at least one downlink broadcast service being decoded by the mobile station; and
receiving an assignment of at least one scheduled uplink unicast transmission from the base station, based on the identified at least one downlink broadcast service being decoded by the mobile station, such that the at least one uplink, unicast transmission of the mobile station is never concurrent with the at least one downlink broadcast transmission.

12. The method of claim 11, wherein the at least one uplink unicast transmission is given priority over the at least one broadcast transmission for scheduling.

13. The method of claim 11, wherein the at least one broadcast transmission is given priority over the at least one uplink unicast transmission for scheduling.

14. The method of claim 11, further comprising transmitting information relating to a change in the broadcast service being decoded by the mobile station, from the mobile station.

15. The method of claim 11, wherein the information identifying the at least one downlink broadcast service being decoded by the mobile station comprises identifiers for the at least one downlink broadcast transmission.

16. The method of claim 11, wherein the information identifying the at least one downlink, broadcast service being decoded by the mobile station comprises time period indicia for the at least one downlink broadcast transmission.

17. The method of claim 11, wherein the at least one unicast transmission transmitted by the mobile station is part of a half duplex unicast transmission.

18. The method of claim 11, wherein the at least one unicast transmission transmitted by the mobile station is part of a full duplex unicast transmission.

19. A base station to reduce interference between an uplink, unicast transmission from at least one mobile station and at least one downlink broadcast transmission, comprising:
logic for assigning at least one time period to the at least one downlink broadcast transmission;
logic for transmitting at least one downlink broadcast service on the at least one time period;
logic for receiving information from the at least one mobile station identifying the at least one downlink broadcast service being decoded by the mobile station; and
logic for scheduling the at least one, uplink, unicast transmission for transmission by the mobile station, based on the identified at least one downlink broadcast service being decoded by the mobile station, so that the at least one uplink, unicast transmission of the mobile station is never concurrent with the at least one downlink broadcast transmission that the mobile station is decoding.

20. A mobile station to reduce interference between an uplink, unicast transmission from the mobile station and at least one downlink broadcast transmission, comprising:
logic for receiving at least one downlink broadcast service on the at least one downlink broadcast transmission in an at least one assigned time period from a base station;
logic for transmitting information to the base station identifying the at least one downlink, broadcast service being decoded by the mobile station; and
logic for receiving an assignment of at least one scheduled uplink, unicast transmission and a scheduling of at least one downlink broadcast transmission from the base station, based on the identified at least one downlink broadcast service being decoded by the mobile station, such that the at least one uplink unicast transmission of the mobile station is never concurrent with the at least one downlink broadcast transmission.

21. The method of claim 9, wherein the at least one mobile station comprises a full duplex mobile station and the scheduling of the at least one uplink unicast transmission for transmission by the at least one mobile station comprises scheduling a second time period that is the same as the third time period.

22. The method of claim 1 further comprising scheduling of a plurality of broadcast transmissions so that the at least one uplink unicast transmission of the at least one mobile station is never concurrent with any of the plurality of downlink broadcast transmissions.

23. The base station of claim 19 wherein the logic for scheduling schedules a downlink unicast transmission in a third time period so that the mobile station is capable of receiving a downlink unicast transmission in the third time period without causing interference to the at least one downlink broadcast transmission or the at least one uplink unicast transmission.

24. The base station of claim 19 wherein the logic for scheduling schedules a plurality of broadcast transmissions so that the at least one uplink unicast transmission of the mobile station is never concurrent with any of the plurality of downlink broadcast transmissions.

* * * * *

UNITED STATES PATENT AND TRADEMARK OFFICE
CERTIFICATE OF CORRECTION

PATENT NO. : 8,098,621 B2  Page 1 of 1
APPLICATION NO. : 11/209281
DATED : January 17, 2012
INVENTOR(S) : Martin W. Beale It is certified that error appears in the above-identified patent and that said Letters Patent is hereby corrected as shown below:

IN THE CLAIMS:

Column 15, Claim 16, Line 65: Change "downlink," to -- downlink --; and

Column 16, Claim 20, Line 32: Change "downlink," to -- downlink --.

Signed and Sealed this
Twenty-ninth Day of May, 2012

David J. Kappos
*Director of the United States Patent and Trademark Office*